US 6,751,478 B1

(12) United States Patent
Sakai et al.

(10) Patent No.: US 6,751,478 B1
(45) Date of Patent: Jun. 15, 2004

(54) MOBILE-SERVICE SWITCH, HOME MEMORY NODE, AND GATEWAY SWITCH

(75) Inventors: Kenichiro Sakai, Kawasaki (JP); Takayuki Iseyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 455 days.

(21) Appl. No.: 09/696,821

(22) Filed: Oct. 26, 2000

(30) Foreign Application Priority Data

Jan. 17, 2000 (JP) ........................................ 2000-007710

(51) Int. Cl.[7] .............................. H04B 1/38; H04M 1/00
(52) U.S. Cl. ..................... 455/560; 455/445; 455/453; 455/450; 455/433
(58) Field of Search ............................ 455/560, 445, 455/433, 450, 9, 424, 435, 453, 514, 432.3, 435.1

(56) References Cited

U.S. PATENT DOCUMENTS

| | | | | | |
|---|---|---|---|---|---|
| 5,548,533 | A | * | 8/1996 | Gao et al. | 455/445 |
| 5,884,179 | A | * | 3/1999 | Patel | 455/432.1 |
| 5,890,075 | A | * | 3/1999 | Cyr et al. | 455/560 |
| 5,892,818 | A | * | 4/1999 | Lee | 379/112.1 |
| 6,078,811 | A | * | 6/2000 | Lin et al. | 455/435.1 |
| 6,151,499 | A | * | 11/2000 | Vudali et al. | 455/445 |
| 6,192,250 | B1 | * | 2/2001 | Buskens et al. | 455/433 |
| 6,421,537 | B1 | * | 7/2002 | Lamb et al. | 455/445 |
| 6,487,412 | B1 | * | 11/2002 | Brennan et al. | 455/445 |

FOREIGN PATENT DOCUMENTS

JP        7-302246        11/1995

* cited by examiner

Primary Examiner—Nick Corsaro
Assistant Examiner—John F Lee
(74) Attorney, Agent, or Firm—Katten Muchin Zavis Rosenman

(57) ABSTRACT

The invention relates to a mobile-service switch in which the load of channel control and call set-up for individual wireless zones formed under the mobile-service switch is distributed to processors corresponding to the respective wireless zones and a processor that is to perform a channel control and call set-up on a termination call that actually has occurred is efficiently determined while cooperation is made with a home location register and a gateway switch, as well as to a home memory node and a gateway switch that cooperate with the mobile-service switch. In a mobile communication system provided with such a mobile-service switch, home memory node, and gateway switch, the service quality is improved at a low cost while high reliability attained by the load distribution is not lowered and flexible adaptation is made to a variety of forms of functional distribution of the mobile-service switch, the home memory node, and the gateway switch.

15 Claims, 21 Drawing Sheets

FIG. 8

| CALL IDEN-TIFICATION INFORMATION TLDN | SUBSCRIBER NUMBER ID | LOCATION INFORMATION | PROCESSOR NUMBER |
|---|---|---|---|

MOBILE-SERVICE SWITCH, HOME MEMORY NODE, AND GATEWAY SWITCH

BACKGROUND OF THE INVENTION

1. Field of the Invention

The present invention relates to mobile-service switches, a home memory node, and a gateway switch in a mobile communication system of a small zone scheme. Each mobile-service switch incorporates a plurality of processors that cooperate with each other during the course of call processing on a call that has occurred in an individual mobile station and share predetermined loads and functions. The home memory node provides location information of the mobile stations. The gateway switch cooperates with the mobile-service switches and the home memory node and interfaces with a desired network.

2. Description of the Related Art

In mobile communication systems, load distribution and functional distribution are attained by incorporating, in radio base stations, base station controllers, and switch offices, a number of processors that are inexpensive and superior in performance and cooperate with each other and total reliability and flexible adaptation to a variety of forms relating to expansion, maintenance, and operation are secured.

FIG. 17 shows an example configuration of a mobile communication system to which a distributed processing scheme is applied.

As shown in FIG. 17, a gateway switch office 60 is connected to a mobile-service switch office 70 via inter-office links 61-1 to 61-N and also connected to a home location register 80 via a communication link 62. The home location register 80 is connected to corresponding ports of the mobile-service switch office 70 via communication links 81-1 to 81-N. The mobile-service switch office 70 is connected to radio base stations 90-1 to 90-N via respective sets of digital links 71-1 to 71-1$n$, ..., 71-N1 to 71-N$n$. A mobile station 92 is located in, for example, a wireless zone 91-3 among wireless zones 91-1 to 91-N that are formed by the respective radio base stations 90-1 to 90-N.

The mobile-service switch office 70 is comprised of the following components (1)–(3):

(1) A main processor (MPR) 72

(2) A communication link 73 connected to the communication port of the main processor 72.

(3) Submodules 74-1 to 74-N that have respective communication ports connected to the main processor 72 via the communication link 73 and that are connected to the respective inter-office links 61-1 to 61-N, the respective communication links 81-1 to 81-N, and the respective sets of digital links 71-11 to 71-1$n$, ..., 71-N1 to 71-N$n$.

The submodule 74-1 is composed of the following components (a)–(e):

(a) A switch module 75-1

(b) a call processor (CPR) 76-1 having a port that is connected to the control terminal of the switch module 75-1 and the above-mentioned communication port that is connected to the communication link 73.

(c) A digital trunk (DT) 77G-1 that is directly connected to the inter-office link 61-1 and is connected to one, of the ports of the switch module 75-1, corresponding to the inter-office link 61-1.

(d) A digital trunk (DT) 77H-1 that is directly connected to the communication link 81-1 and is connected to one, of the ports of the switch module 75-1, corresponding to the communication link 81-1.

(e) Digital trunks (DTs) 77B-11 to 77B-1$n$ that are directly connected to the respective digital links 71-11 to 71-1$n$ and are connected to ones, of the ports of the switch module 75-1, corresponding to the respective digital links 71-11 to 71-1$n$.

Since the submodules 74-2 to 74-N have the same configuration as the submodule 74-1, they are not illustrated in detail in FIG. 17 and will not be described. The components of the submodules 74-2 to 74-N will be given the same reference symbols as the corresponding components of the submodule 74-1 except that the reference symbols will have first suffixes "2" to "N."

In the mobile communication system having the above configuration, the home location register 80 has a database in which combinations of a subscriber number, an identifier, and a switch identification number MSCID (described below) are registered.

- Unique subscriber numbers that are given to respective mobile stations (including the above-mentioned mobile station 92) each of which is located in one of the wireless zones 91-1 to 91-N.
- Identifiers acquired for the respective mobile stations according to a predetermined channel control procedure and that indicate, among the wireless zones 91-1 to 91-N, wireless zones (hereinafter referred to as "visit-zones") where the respective mobile stations actually exist.
- Unique switch identification numbers MSCIDs given to mobile-service switch offices each of which is connected to the gateway switch office 60 via its outgoing lines and is to perform call set-up in cooperation with a radio base station that forms the visit-zone.

A scheme of location registration for updating the contents of the database and a procedure of channel control performed during the course of the location registration through cooperation among the individual sections are not important features of the invention and can be realized by using various known techniques, and hence they will not be described.

In the mobile-service switch office 70, the main processor 72 cooperates with the call processors 76-1 to 76-N according to predetermined procedures of call set-up and channel control in such a manner as to exchange messages with the call processors 76-1 to 76-N.

In the submodule 74-1, the call processor 76-1 has the initiative of setting and canceling a speech path to be formed in the switch module 75-1 according to the above-mentioned procedures of call set-up and channel control. Further, the call processor 76-1 forms, as fixed pseudo-speech paths, in the switch module 75-1, communication links (not shown) for exchange of messages between the call processor 76-1 and the digital trunks 77G-1, 77H-1, and 77B-11 to 77B-1$n$.

The digital trunks 77G-1, 77H-1, and 77B-11 to 77B-1$n$ relay the following messages:

A message to be exchanged with the gateway switch office 60 via the inter-office link 61-1.

A message to be exchanged with the home location register 80 via the communication link 81-1.

A message to be exchanged with the radio base station 90-1 via the digital links 77-11 to 77-1$n$.

Operations of the individual sections of the submodules 74-2 to 74-N are the same as those of the individual sections of the submodule 74-1 and hence will not be described.

When recognizing a call that has been forwarded to the local station via an incoming line (not shown) (indicated by symbol (1) in FIG. 18), the gateway switch office 60 judges whether the destination party is a mobile station that can be located in any of the wireless zones 91-1 to 91-N by performing code translation on the call (step (1) in FIG. 19). When the judgment result is true, the gateway switch office 60 acquires a subscriber number ID of this mobile station (for the sake of simplicity, it is assumed to be the mobile station 92) (step (2) in FIG. 19).

Then, the gateway switch office 60 generates a location request including the subscriber number ID and sends the generated location request to the home location register 80 via the communication link 62 (indicated by symbol (2) in FIG. 18; step (3) in FIG. 19).

The home location register 80 acquires, from the above-mentioned database, a visit-zone identifier (hereinafter referred to simply as "location information") and a switch identification number MSCID that constitutes the combination (mentioned above) together with the subscriber number ID included in the location request (indicated by symbol (3) in FIG. 18; step (1) in FIG. 20).

Then, the home location register 80 sends a routing request including the subscriber number ID and the location information to the mobile-service switch office (for simplicity, it is assumed to be the mobile-service switch office 70) that is indicated by the switch identification number MSCID (indicated by symbol (4) in FIG. 18).

Among the communication links 81-1 to 81-N, a communication link to be used for the transmission of the routing request is selected through cooperation between an operating system and a driver (BIOS) (described below) or with a lead by one of those among pieces of software that are provided in the home location register 80.

An operating system provided as software higher in rank than an application system that gives a trigger for a routing request and performing a predetermined communication control.

A driver (BIOS) that performs physical interfacing with the communication links 81-1 to 81-N under the above operating system.

Therefore, when the above-mentioned routing request is sent from the home location register 80 to the communication link 81-4, for example, in the mobile-service switch office 70 it is transmitted to the call processor 76-4 via the digital trunk 77H-4 and the switch module 75-4.

Upon recognition of the routing request, the call processor 76-4 judges whether termination is possible at the mobile station 92 indicated by the subscriber number ID by recognizing a state and information described below based on the subscriber number ID and the location information included in the routing request (indicated by symbol (5) in FIG. 18).

A state that a certain call occurred in advance at the mobile station 92 indicated by the subscriber number ID and it still continues to exist.

Whether or not there is a factor (e.g., a subscriber class or subscriber data) that prevents the mobile station 92 from responding to paging of the local station.

Whether or not there is a factor (e.g., congestion or a trouble in the radio base station) that prevents paging of the mobile station 92 in the wireless zone (for simplicity, it is assumed to be the wireless zone 91-3) indicated by the location information.

A procedure of processing to be performed by the call processor 76-4 singly or in cooperation with the main processor 72 to recognize a state and information described above does not relate to the invention and can be realized by using various known techniques, and hence it will not be described.

When the judgment result is true, the call processor 76-4 assigns unique call identification information TLDN to the termination call concerned, generates a routing response including, together with the call identification information TLDN, the above-mentioned subscriber number ID and location information, and sends the generated routing response to the home location register 80 via switch module 75-4, the digital trunk 77H-4 and the communication link 81-4 (indicated by symbol (6) in FIG. 18; step (1) in FIG. 21).

Upon recognition of the routing response, the home location register 80 generates a location request response including the call identification information TLDN, the subscriber number ID, and the location information that are included in the routing response (indicated by symbol (7) in FIG. 18) and sends the generated location request response to the gateway switch office 60 via the communication link 62 (indicated by symbol (8) in FIG. 18; step (2) in FIG. 20).

Upon recognition of the location request response, the gateway switch office 60 generates an address message including the call identification information TLDN, the subscriber number ID, and the location information that are included in the location request response (indicated by symbol (9) in FIG. 18) and sends the generated address message to the mobile-service switch office 70 via one of the inter-office links 61-1 to 61-N (indicated by symbol (10) in FIG. 18; step In the mobile-service switch office 70, when the address message has been sent from the gateway switch office 60 via, for example, the inter-office link 61-1, the call processor 76-1 accepts the address message that is received via the digital trunk 77G-1 and the switch module 75-1 (indicated by symbol (11) in FIG. 18).

The call processor 76-1 judges whether the wireless zone that is indicated by the location information included in the address message is the wireless zone that is formed under the call processor 76-1 itself (indicated by symbol (12) in FIG. 18; step (2) in FIG. 21).

When the judgment result is true, the call processor 76-1 acquires the call identification information TLDN and the subscriber number ID that are included in the address message concerned together with the location information and pages the mobile station 92 indicated by the subscriber number. ID by cooperating with the radio base stations 90-1 to 90-N via the digital trunks 77B-11 to 77B-1*n* and the digital links 71-11 to 71-1*n* (indicated by step (3) in FIG. 21).

However, when the result of the above judgment is false, the call processor 76-1 inquires of the other call processors 76-2 to 76-N, via the communication link 73 and the main processor 72, whether the wireless zone indicated by the location information that is included in the address message is the wireless zone formed under each of those call processors 76-2 to 76-N (indicated by symbol (13) in FIG. 18; step (4) in FIG. 21).

Upon,recognition of a call processor (for simplicity, it is assumed to be the call processor 76-3) with which an affirmative response has been obtained for the above inquiry among the call processors 76-2 to 76-N, the call processor 76-1 passes the above-mentioned call identification information TLDN and subscriber number ID to the call processor 76-3 and thereby transfers the leadership of the call processing and the channel control that relate to the termination call concerned (indicated by symbol (14) in FIG. 18; step (5) in FIG. 21).

Irrespective of the call processor (one of the call processors 76-1 to 76-N) that leads such a channel control and call processing, processing that is performed through cooperation among the individual sections to make the termination call concerned complete does not relate to the invention and can be realized by using various known techniques, and hence it will not be described.

Additionally, in the above conventional example, even when mobile stations to be termination parties are in the same visit-zone, in the mobile-service switch office 70 call processors to receive routing requests or address messages are not necessarily the same call processor and it is highly probable that they are different from call processors to lead call set-up and a channel control for termination calls concerned.

Therefore, in the process of such call set-up, the call processors 76-1 to 76-N need to share office data including subscriber data or cooperate with each other by exchanging desired messages with a lead by the main processor 72.

However, the sharing of office data and the exchange of messages require more resources such as memory blocks and throughput as the rate of interprocessor communications that are necessary to secure a desired response speed and service quality increases.

The necessary amount of such resources increases as the number of call that may occur parallel in accommodated mobile stations increases, resulting in increasing the running cost. Further, the necessary amount of such resources is the main factor of determining a traffic volume range where occurrence of congestion and an overloaded state is allowable.

SUMMARY OF THE INVENTION

An object of the invention is to provide a mobile-service switch, a home memory node, and a gateway switch capable of increasing efficiency of call processing and channel control without altering a basic hardware configuration and lowering service quality.

Another object of the invention is to flexibly adapt to various forms of functional distribution of a mobile-service switch office, a gateway switch office and a home location register and improve service quality at low cost in a mobile communication system applied to the invention without lowering high reliability to be attained by individual mobile-service switch offices performing call processing as distributed processing based on a load distribution scheme.

Another object of the invention is to reliably determine a means which is to perform call set-up to make a call occurring complete during the course of transit switching performed by a home location register in liaison with a gateway switch office or the gateway switch office alone so as to simplify and expedite processing relating to the call set-up.

Another object of the invention is to simplify a procedure of call processing, reduce the throughput of the call processing, and enable flexible adaptation to various forms of load distribution for the call processing.

Another object of the invention is to increase the completion rate of calls to be terminated at a mobile station.

Still another object of the invention is to simplify processing to be performed by a plurality of means to perform paging, compared with processing of notifying a judgement result of paging performed by a means other than the plurality of means.

Yet another object of the invention is to reduce a load of call set-up without substantially decreasing a call completion rate, compared with a case where a possibility of termination to a mobile station as a destination party is judged under the initiative of a switch other than a home location register.

A further object of the invention is to reduce a load of call set-up without substantially decreasing a call completion rate even when call processing in conformity with channel control over individual wireless zones is performed as distributed processing by a plurality of means.

Another object of the invention is to prevent unnecessary call processing in mobile-service switch offices other than the one which is to perform call processing in conformity with channel control over a wireless zone where a mobile station as a destination party can be located compared with a case where location information and the identifier of a call are notified in parallel to other mobile-service switch offices.

Another object of the invention is to realize flexible adaptation to various forms of load distribution of mobile-service switch offices while suppressing an increase in a load shared with submodules.

Another object of the invention is to prevent unnecessary call processing from being performed in parallel in submodules provided for load distribution in individual mobile-service switch offices.

Still another object of the invention is to suppress an increase in a load of mobile-service switch offices and realize flexible adaptation to various forms of load distribution even in a case where the load of individual mobile-service switch offices is shared with a plurality of submodules.

Yet another object of the invention is to realize flexible adaptation to not only forms of load distribution applied to individual mobile-service switch offices but also various forms of service.

A further object of the invention is to effectively utilize location information acquired during the course of location registration and achieve reduction of resources used for call processing and improvement of service quality.

The above objects are achieved by a mobile-service switch which judges whether or not termination is possible at a mobile station as a destination party in response to an inquiry from a home location register, determines a call processor (CPR) that is to perform a channel control over a wireless zone where the mobile station visits when the judgment result is true, and sends a response including identification information of the CPR to the home location register.

In the mobile-service switch having the above configuration, it is possible to determine a means for performing call set-up on a call which is to be terminated at any mobile station, judge a possibility of termination of the call, and notify the home location register or the gateway switch office of the result.

The above objects are also achieved by a mobile-service switch different from the above first mobile-service switch in that a response sent to the home location register does not include identification information of the CPR.

In the mobile-service switch having the above configuration, whereas the home location register is notified of the judgment result of a possibility of termination above, neither determined is a distributed call processing section that is to perform call set-up on the call concerned nor performed is processing of notifying the home location register of the determined distributed call processing section.

The above objects are achieved by a mobile-service switch which pages a mobile station as a destination party in subordinate wireless zones, determines, among those wireless zones, a CPR which is to perform a channel control of a base station having a wireless zone where a response has been obtained, and send a response including identification information of the determined CPR to the home location register.

In the mobile-service switch having the above configuration, a means to perform call processing on the above call is able to perform call set-up in a wireless zone where a mobile station to be a destination party is located as long as the mobile station wait in readiness for actually responding to paging.

In addition, the above objects are achieved by a mobile-service switch which performs paging in response to a request from another CPR and sends a response including identification information of a CPR which recognizes the response to the paging, to a home location register.

In the mobile-service switch having the above configuration, processing of notifying a result of the paging performed in parallel by a plurality of means is not performed by any of those means.

The above objects are further achieved by a mobile-service switch which judges, in response to an inquiry from a home location register including an identifier of a wireless zone where a mobile station as a destination party can be located, whether or not termination is possible at the mobile station, determines a CPR that is to perform a channel control over a wireless zone corresponding to the identifier when the judgment result is true, and sends a notice including identification information of the CPR to the home location register.

In the mobile-service switch having the above configuration, a wireless zone to be judged for the possibility of termination is determined under the initiative of the home location register having, as database, location information of a mobile station as a destination party.

The above objects are achieved by a mobile-service switch which judges, in response to an inquiry from a home location register including an identifier of a CPR that is to perform a channel control over a wireless zone where a mobile station as a destination party can be located, whether or not termination is possible at the mobile station and sends a notice including identification information of the CPR to the home location register when the judgment result is true.

In the mobile-service switch having the above configuration, the possibility of termination is judged based on a procedure of call processing by a means which is to perform call processing in conformity with channel control over a wireless zone where a mobile station to be a destination party can be located.

According to another aspect of the invention, there is provided a home memory node which has visit-zones of individual mobile stations as database and which, when receiving a location request from a gateway switch, notifies an identifier of a visit-zone of a mobile station indicated by the location request to a mobile-service switch which is to perform processing relating to a base station having a visit-zone of a mobile station.

In the home memory node having the above configuration, the above-mentioned location information and identifier are notified to a mobile-service switch office which is to perform call processing in conformity with channel control over the wireless zone where a mobile station as a destination party of a call is located.

The above objects are achieved by a home memory node which has, as database, identification information of a CPR to perform call processing in liaison with a channel control relating to individual wireless zones, temporarily stores a visit-zone included in a routing request at the time of sending the routing request. When a response indicating a possibility of termination at a mobile station corresponding to a visit-zone is received from a mobile-service switch office which is a destination of the routing request, the home memory node acquires identification information of a CPR corresponding to the stored visit-zone corresponding to the mobile station and sends the acquired identification information and the response to a gateway switch office.

In the home memory node having the above configuration, both of the identification information and the response are used for transit switching to be performed by the gateway switch office and the former is reliably notified to the gateway switch office even when it is not returned from any of the mobile-service switch offices.

The invention provides a home memory node which has visit-zones of individual mobile stations as database and sends a routing request including identification information of a CPR that is to perform processing relating to a base station having a visit-zone of a mobile station indicated by the location request, to a mobile-service switch office that is to perform the above processing when receiving a location request from a gateway switch office.

In the home memory node having the above configuration, the location information and the identifier of the call are notified to a specific submodule which shares a load of call processing among submodules provided in a mobile-service switch office which is to perform call processing in conformity with channel control over the wireless zone where the mobile station as a destination party of the call is located.

The invention provides a home memory node which has, as database, identification information of a CPR to perform call processing in liaison with a channel control relating to individual wireless zones and temporarily stores identification information of a CPR included in a routing request at the time of sending the routing request. When a response indicating a possibility of termination at a mobile station corresponding to the identification information is received from a mobile-service switch office which is a destination of the routing request, the home memory node acquires identification information of a CPR corresponding to the stored identification information corresponding to the mobile station and sends the acquired identification information and the response to a gateway switch office.

In the home memory node having the above configuration, both of the location information and the response are used for transit switching to be performed by the gateway switch office and the former is reliably notified to the gateway switch office even when it is not returned from any of the mobile-service switch offices.

The invention provides a home memory node which adds an attribute of a corresponding mobile station to a response to be sent to a gateway switch office.

In the home memory node having the above configuration, since the attribute indicates a form of service to be provided to the mobile station where a call has been terminated, the gateway switch office can perform transit switching for the termination call flexibly adapting to not only forms of load distribution applied to mobile-service switch offices but also various forms of service.

According to a further aspect of the invention, there is provided a gateway switch which requests location information of a mobile station to be a destination party of a call which has occurred from a home location register and when receiving from the home location register a routing response including identification information of a CPR that is to perform call processing on the call, requests the CPR indicated by the identification information to perform termination processing.

In the gateway switch having the above configuration, since an outgoing line used for transferring the call is determined under the initiative of a home memory, for a mobile-service switch office that is to perform call set-up relating to a destination party of the call, location information acquired during the course of location registration is effectively utilized, resources used for call processing is reduced, and the service quality is improved.

The invention provides a gateway switch which judges whether or not an attribute of a mobile station as a destination party that has been supplied via an incoming line or from a home location register satisfies a predetermined condition, and which requests a CPR indicated by identification information included in a routing response to perform termination processing only when the judgment result is true.

In the gateway switch having the above configuration, the attribute indicates a form of service to be provided to the mobile station where a call has been terminated so that it is possible to perform transit switching for the call with flexible adaptation to not only forms of load distribution applied to mobile-service switch offices but also various forms of service.

Other objects and features of the invention will be apparent from the following detailed description taken in connection with the accompanying drawings.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 8 shows the structure of call identification information;

DESCRIPTION OF THE PREFERRED EMBODIMENTS

First, the principles of mobile-service switches according to the invention will be described with reference to a block diagram of FIG. 1.

Figure 1:
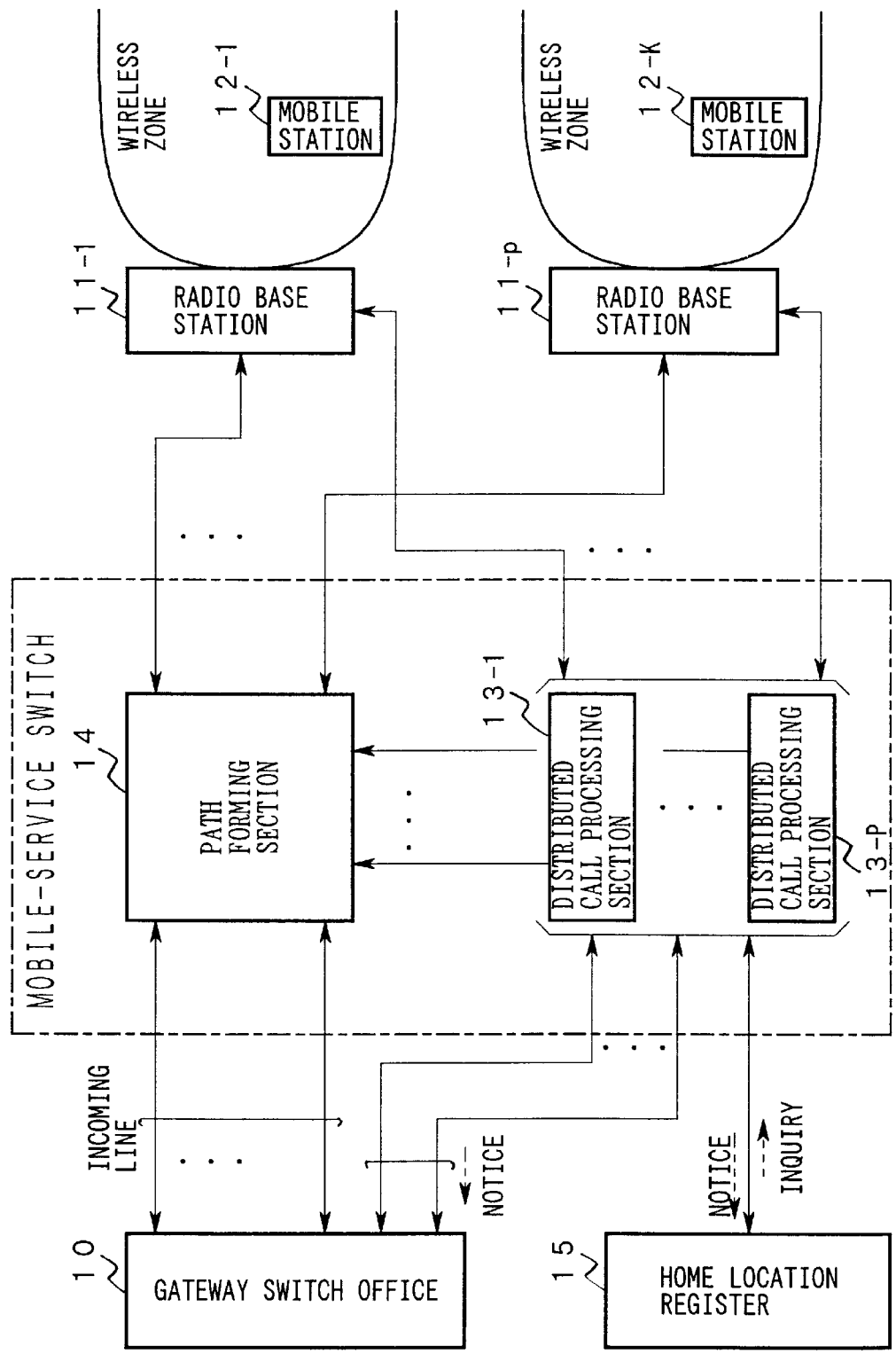
FIG. 1 is a block diagram showing the principle of a mobile-service switch according to the present invention.

Each mobile-service switch shown in FIG. 1 is comprised of a path forming section 14 and distributed call processing sections 13-1 to 13-P in liaison with a gateway switch office 10, a home location register 15, and radio base stations 11-1 to 11-p.

The principle of a first mobile-service switch according to the invention is as follows.

The distributed call processing sections 13-1 to 13-P perform call processing, as distributed processing based on load distribution scheme, by associating with a plurality of radio base stations 11-1 to 11-p, on a call from an incoming line formed between the distributed call processing sections 13-1 to 13-P and the gateway switch office 10 and to be terminated at one of mobile stations 12-1 to 12-K that can be located in wireless zones formed under the individual radio base stations 11-1 to 11-p.

The path forming section 14 forms, between the gateway switch office 10 and the radio base stations 11-1 to 11-p, a path based on a procedure of call processing performed by the distributed call processing sections 13-1 to 13-P.

When receiving an inquiry relating to a mobile station to be a destination party of the above call from the home location register 15 having, as a database, location information of the mobile stations 12-1 to 12-K, the distributed call processing sections 13-1 to 13-P judge whether or not termination at the mobile station is possible and determines, among the distributed call processing sections 13-1 to 13-P, the one that is to perform call set-up in conformity with channel control over the wireless zone where the mobile station visits. Further, the distributed call processing sections 13-1 to 13-P notify one of the home location register 15 and the gateway switch office 10 of the determined distributed call processing section and the judgment result.

In the mobile-service switch having the above configuration, for a call to be terminated at any mobile stations 12-1 to 12-k, one, of the distributed call processing sections 13-1 to 13-p, for performing call set-up on the call is determined, a possibility of termination is judged, and the result is notified to the home location register 15 or the gateway switch office 10.

Therefore, a distributed call processing section that is to perform call set-up to make such a call complete can be reliably determined during the course of transit switching which is performed in liaison with the home location register 15 and the gateway switch office 10 or by the gateway switch office 10 alone, thereby simplifying the processing relating to the above call set-up and increasing its efficiency.

The principle of a second mobile-service switch according to the invention is as follows.

The distributed call processing sections 13-1 to 13-P perform call processing, as distributed processing based on a load distribution scheme, by associating with a plurality of radio base stations 11-1 to 11-p, on a call from an incoming line formed between the distributed call processing sections 13-1 to 13-P and the gateway switch office 10 and to be terminated at one of mobile stations 12-1 to 12-K that can be located in wireless zones formed under the individual radio base stations 11-1 to 11-p.

The path forming section 14 forms, between the gateway switch office 10 and the radio base stations 11-1 to 11-p, a path based on a procedure of call processing performed by the distributed call processing sections 13-1 to 13-P.

When receiving an inquiry made by the home location register 15 having location information of the mobile stations 12-1 to 12-K as a database, made about a mobile station to be a destination party of the above-mentioned call, the distributed call processing sections 13-1 to 13-P judge whether or not termination at the mobile station is possible and notifies the judgment result to the home location register 15.

In the mobile-service switch having the above configuration, whereas the home location register 15 is notified of the above judgment result as to whether termination is possible, a distributed call processing section that is to perform call set-up for the call concerned is not determined and notification of the home location register 15 of the determined distributed call processing section is not processed.

Therefore, as long as such a distributed call processing section is determined under the initiative of the home location register 15 and is provided under transit switching performed by the gateway switch office 10, it is possible to simplify the procedure of call processing, reduce the throughput of the call processing, and flexibly adapt to a variety of forms of load distribution realized by the distributed call processing sections 13-1 to 13-P.

The principle of a third mobile-service switch according to the invention is as follows.

The distributed call processing sections 13-1 to 13-P page a mobile station to be a destination party of a call in response to an inquiry from the home location register 15. Further, the distributed call processing sections 13-1 to 13-P determine, among themselves, a distributed call processing section that has obtained a response to the paging as a distributed call processing section that is to perform call set-up in conformity with channel control over a wireless zone where the mobile station visits.

In the mobile-service switch having the above configuration, a distributed call processing section capable of performing call set-up in conformity with channel control for a wireless zone where the mobile station is located is determined as a distributed call processing section that is to perform call processing on the above-mentioned call as long as the mobile station to be a destination party waits in readiness for actually responding to paging.

Therefore, it is possible to improve the call completion rate of a termination call occurring at the mobile stations 12-1 to 12-K, compared with a case where the state of a mobile station to be a destination party or a wireless zone where the mobile station is located is not checked.

The principle of a fourth mobile-service switch according to the invention is as follows.

The distributed call processing sections 13-1 to 13-P page a mobile station to be a destination party of a call in response to an inquiry from the home location register 15.

Further, only when independently determining a response to the paging, one of the distributed call processing sections 13-1 to 13-P notifies one of the home location register 15 and the gateway switch office 10 of itself as the determined distributed call processing section.

In the mobile-service switch having the above configuration, processing of notifying the results of the paging performed by all or part of the distributed call processing sections 13-1 to 13-P in response to the above-mentioned inquiry is not performed by any of the distributed call processing sections 13-1 to 13-P.

Therefore, the processing to be performed by the distributed call processing sections 13-1 to 13-P is more simplified than in a case where one of the distributed call processing sections 13-1 to 13-P performs it.

The principle of a fifth mobile-service switch according to the invention is as follows.

An inquiry from the home location register 15 includes the identifier of a wireless zone where a mobile station to be a destination party of a call can be located, among wireless zones formed under the individual radio base stations 11-1 to 11-p. The distributed call processing sections 13-1 to 13-P judge whether or not termination is possible at the mobile station to be a destination party of the above-mentioned call, only for the wireless zone indicated by the identifier included in the inquiry.

In the mobile-service switch having the above configuration, a wireless zone for which the possibility of termination to be judged is determined under the initiative of the home location register 15 having location information of mobile stations to be destination parties as database.

Therefore, the load of call set-up to be performed by the distributed call processing sections 13-1 to 13-P is made smaller without a large decrease in call completion rate than in a case where the above judgment is performed under the initiative of a switch other than the home location register 15.

The principle of a sixth mobile-service switch according to the invention is as follows.

An inquiry from the home location register 15 includes the identifier of a distributed call processing section, among the distributed call processing sections 13-1 to 13-P, that is to perform call processing in conformity with channel control over a wireless zone where a mobile station to be a destination party of a call can be located. One, of the distributed call processing sections 13-1 to 13-P, indicated by the identifier included in the inquiry judges whether or not termination is possible at the mobile station to be a destination party of the call concerned.

In the mobile-service switch having the above configuration, the possibility of termination is judged according to a procedure of call processing by the distributed call processing section that is to perform call processing in conformity with channel control over the wireless zone where the mobile station to be a destination party can be located.

Therefore, even in a case where call processing in conformity with channel control over individual wireless zones is performed by a plurality of distributed call processing sections as distributed processing, it is able to reduce the load of call set-up without a large decrease in call completion rate.

Figure 2:
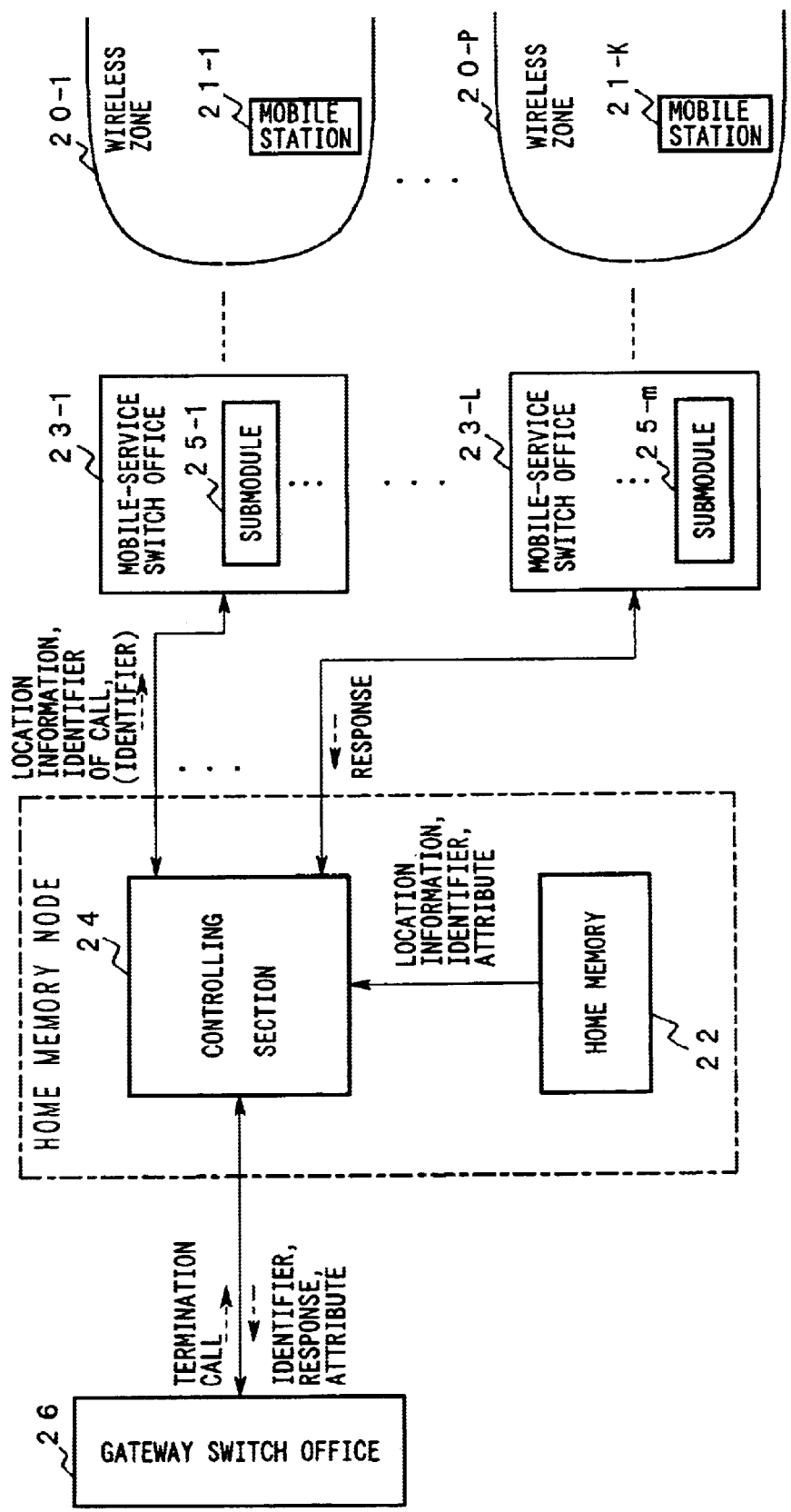
FIG. 2 is a block diagram showing the principle of a home memory node according to the invention.

FIG. 2 is a block diagram showing the principles of home memory nodes according to the invention.

Each home memory node shown in FIG. 2 is comprised of a home memory 22 and a controlling section 24 that associates with mobile-service switch offices 23-1 to 23-L and a gateway switch office 26.

The principle of a first home memory node according to the invention is as follows.

The home memory 22 stores location information indicating a wireless zone where a mobile station is actually located, of wireless zones 20-1 to 20-P where individual mobile stations 21-1 to 21-K can be located. When a call to be terminated at one of the mobile stations 21-1 to 21-K has occurred, the controlling section 24 notifies location information of the mobile station and an identifier of the terminated call to one of the mobile-service switch offices 23-1 to 23-L that is to perform call processing in conformity with channel control over the wireless zone indicated by location information stored in the home memory 22.

In the home memory node having the above configuration, the above-mentioned location information and the identifier of the call is notified to the mobile-service switch office that is to perform call processing in conformity with the channel control over the wireless zone where the mobile station as a destination party of the call is located.

Therefore, it is possible to prevent unnecessary execution of call processing in the mobile-service switch offices other than the above mobile-service switch office in contrast to a case where the same location information and identifier of the call are notified to other mobile-service switches in parallel.

The principle of a second home memory node according to the invention is as follows.

The home memory 22 stores location information and identifiers of submodules 25-1 to 25-m provided in any of the mobile-service switch offices 23-1 to 23-L and sharing a load of call processing for one or both of wireless zones 20-1 to 20-P and mobile stations 21-1 to 21-K.

The controlling section 24 holds location information notified to one of the mobile-service switch offices 23-1 to 23-L and notifies, when receiving a response to the location information, the gateway switch office of an identifier stored together with the location information in the home memory 22 as well as the response.

In the home memory node having the above configuration, both of the location information and the response are used for transit switching to be performed by the gateway switch office 26 and the location information is reliably notified to the gateway switch office 26 by the controlling section 24 even when it is not returned from any of the mobile-service switch offices 23-1 to 23-L.

Therefore, it is able to flexibly adapt to a variety of forms of load distribution of the mobile-service switch offices 23-1 to 23-L while increase in the load of the mobile-service switch offices 23-1 to 23-L shared with the submodules 25-1 to 25-m is suppressed.

The principle of a third home memory node according to the invention is as follows.

The home memory 22 stores location information and identifiers of submodules 25-1 to 25-m provided in one of the mobile-service switch offices 23-1 to 23-L and sharing the load of call processing for one or both of wireless zones 20-1 to 20-P and mobile stations 21-1 to 21-K.

When a call to be terminated at one of the mobile stations 21-1 to 21-K has occurred, the controlling section 24 acquires location information and an identifier stored in the home memory 22, relating to the mobile station for which the call has been terminated. Further, the controlling section 24 notifies one of the submodules 25-1 to 25-m indicated by the identifier of the location information and an identifier of the termination call.

In the home memory node having the above configuration, the above-mentioned location information and the identifier of the call are notified to a specific submodule which shares the load of the call processing, among the submodules provided in a mobile-service switch office that is to perform call processing in conformity with channel control over the wireless zone where the mobile station as a destination party of the call is located.

Therefore, unnecessary call processing is prevented from being performed in parallel in the submodules other than the specific submodule provided in the above mobile-service switch offices in contrast to a case where the same location information and identifier of the call are notified to other submodules in parallel.

The principle of a fourth home memory node according to the invention is as follows.

The home memory 22 stores location information and identifiers of submodules 25-1 to 25-m provided in one of the mobile-service switch offices 23-1 to 23-L and sharing a load of call processing for one or both of wireless zones 20-1 to 20-P and mobile stations 21-1 to 21-K.

The controlling section 24 notifies one of the mobile-service switch offices 23-1 to 23-L of location information and an identifier stored in the home memory 22, and holds the notified identifier. Further, when receiving a response to the location information and the identifier, the controlling section 24 notifies the gateway switch office 26 of the held identifier as well as the response.

In the home memory node having the above configuration, both of the location information and the response are used for transit switching to be performed by the gateway switch office 26 and the location information is reliably notified to the gateway switch office 26 by the controlling section 24 even in a case where it is not returned from any of the mobile-service switch offices 23-1 to 23-L.

Therefore, it is possible to flexibly adapt to a variety of forms of load distribution of the mobile-service switch offices 23-1 to 23-L while increase in the load of the mobile-service switch offices 23-1 to 23-L is suppressed.

The principle of a fifth home memory node according to the invention is as follows.

The home memory 22 stores not only location information of mobile stations 21-1 to 21-K but also attributes of the mobile stations 21-1 to 21-K.

The controlling section 24 notifies the gateway switch office 26 of a response and an identifier as well as an attribute stored in the home memory 22, relating to a mobile station where a call has occurred among the mobile stations 21-1 to 21-K.

In the home memory node having the above configuration, since the attribute indicates a form of service to be provided to the mobile station where the call has been terminated, the gateway switch office 26 can perform transit switching for the termination call while flexibly adapting to not only forms of load distribution applied to the mobile-service switch offices 23-1 to 23-L but also a variety of forms of service.

Figure 3:
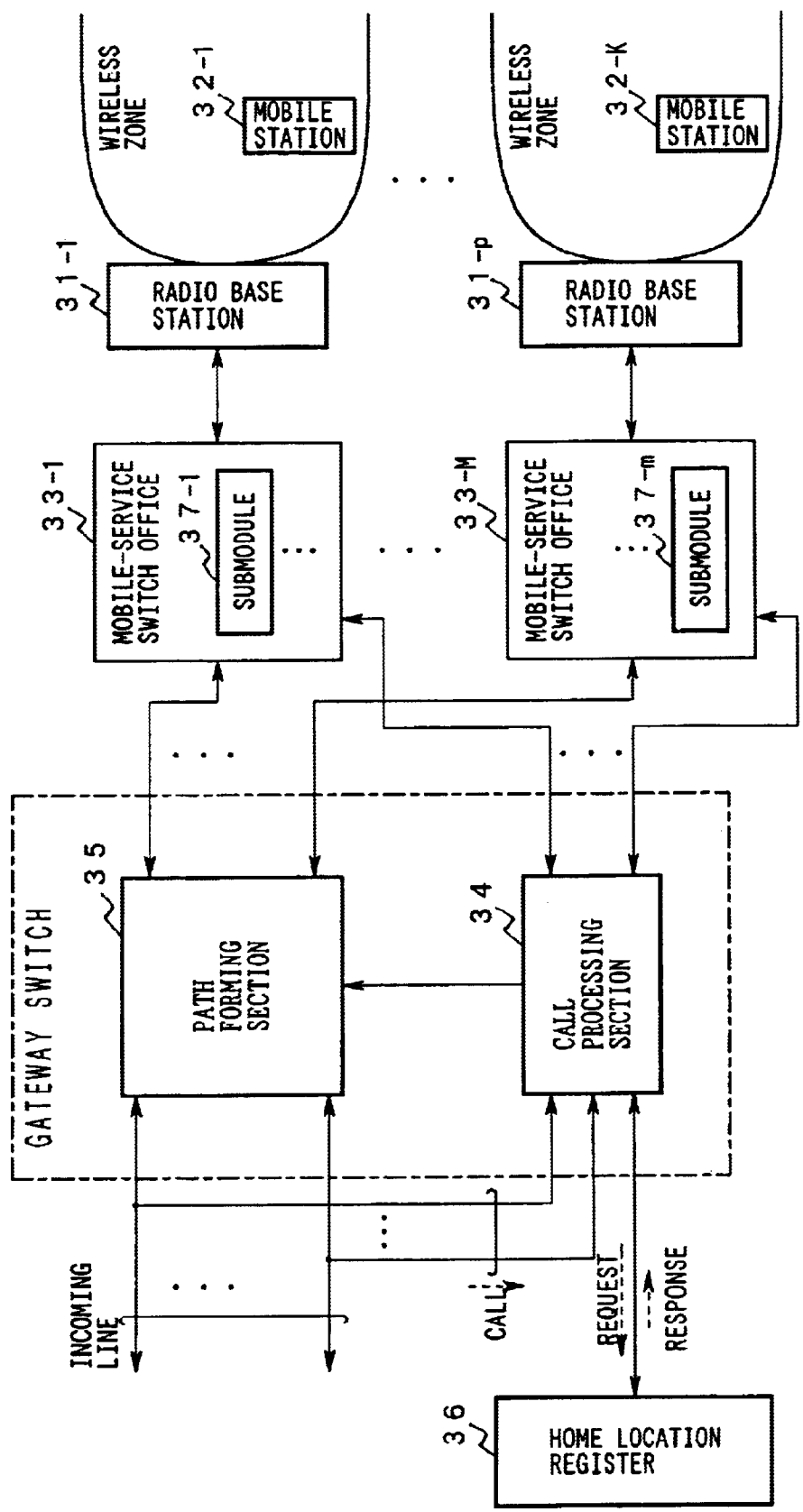
FIG. 3 is a block diagram showing the principle of a gateway switches according to the invention.

FIG. 3 is a block diagram showing the principles of gateway switches according to the invention.

Each gateway switch shown in FIG. 3 is comprised of a path forming section 35 that is connected to mobile-service switch offices 33-1 to 33-M and a call processing section 34 in liaison with the mobile-service switch offices 33-1 to 33-M and a home location register 36.

The principle of a first gateway switch according to the invention is as follows.

The call processing section 34 performs call processing on a call from an incoming line and to be terminated at one of mobile stations 32-1 to 32-K that can be located in wireless zones formed under individual radio base stations 31-1 to 31-p. Further, the call processing section 34 transfers the call to the mobile-service switch offices 33-1 to 33-M that perform call processing in conformity with channel control over those wireless zones. The path forming section 35 forms a path between the incoming line and the mobile-service switch offices 33-1 to 33-M according to a procedure of the call processing by the call processing section 34.

The call processing section 34 requests, to the home location register 36, location information of a wireless zone where one of the mobile station 32-1 to 32-K to be a destination party of the call visits. When receiving a response to the request including the identifier of a submodule that is to share the load of call-processing the call, among submodules 37-1 to 37-m provided in one of the mobile-service switch offices 33-1 to 33-M, the call processing section 34 determines an outgoing line formed between the path forming section 35 and a submodule indicated by the received identifier as an outgoing line for the call.

In the gateway switch having the above configuration, determining an outgoing line for transfer of the call under the initiative of the home location register 36 in a mobile-service switch office that is to perform call set-up relating to a destination party of the call makes it possible to effectively utilize location information acquired during the course of location registration and reduce resources for call processing and improve the service quality.

The principle of a second gateway switch according to the invention is as follows.

A response to the request for location information from the home location register 36 includes an attribute of a mobile station to be a destination party of a call. The call processing section 34 judges whether or not the attribute included in the response satisfies a predetermined condition and routes the call only when the judgment result is true.

In the gateway switch having the above configuration, since the attribute indicates a form of service to be provided to the mobile station where the call has been terminated, transit switching for the call is performed while flexible adaptation is made to not only forms of load distribution applied to the mobile-service switch offices 33-1 to 33-M but also a variety of forms of service.

Embodiments of the invention will be hereinafter described in detail with reference to the drawings.

Figure 4:
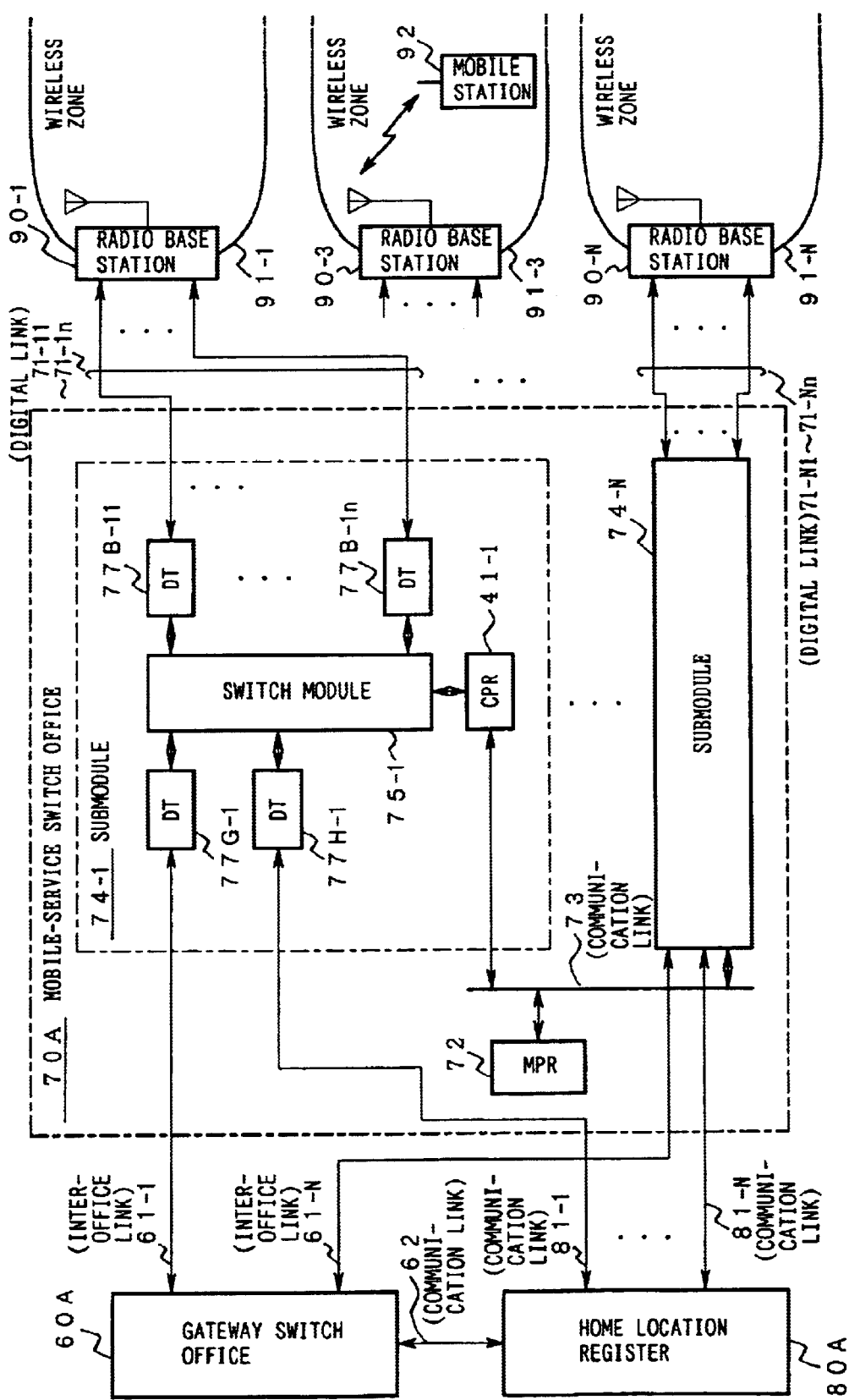
FIG. 4 shows the configuration of embodiments of the invention.

FIG. 4 shows the configuration of the embodiments of the invention. The components in FIG. 4 that are the same in function and configuration as the corresponding components in FIG. 17 are given the same reference symbols as the latter and will not be described.

Figure 17:
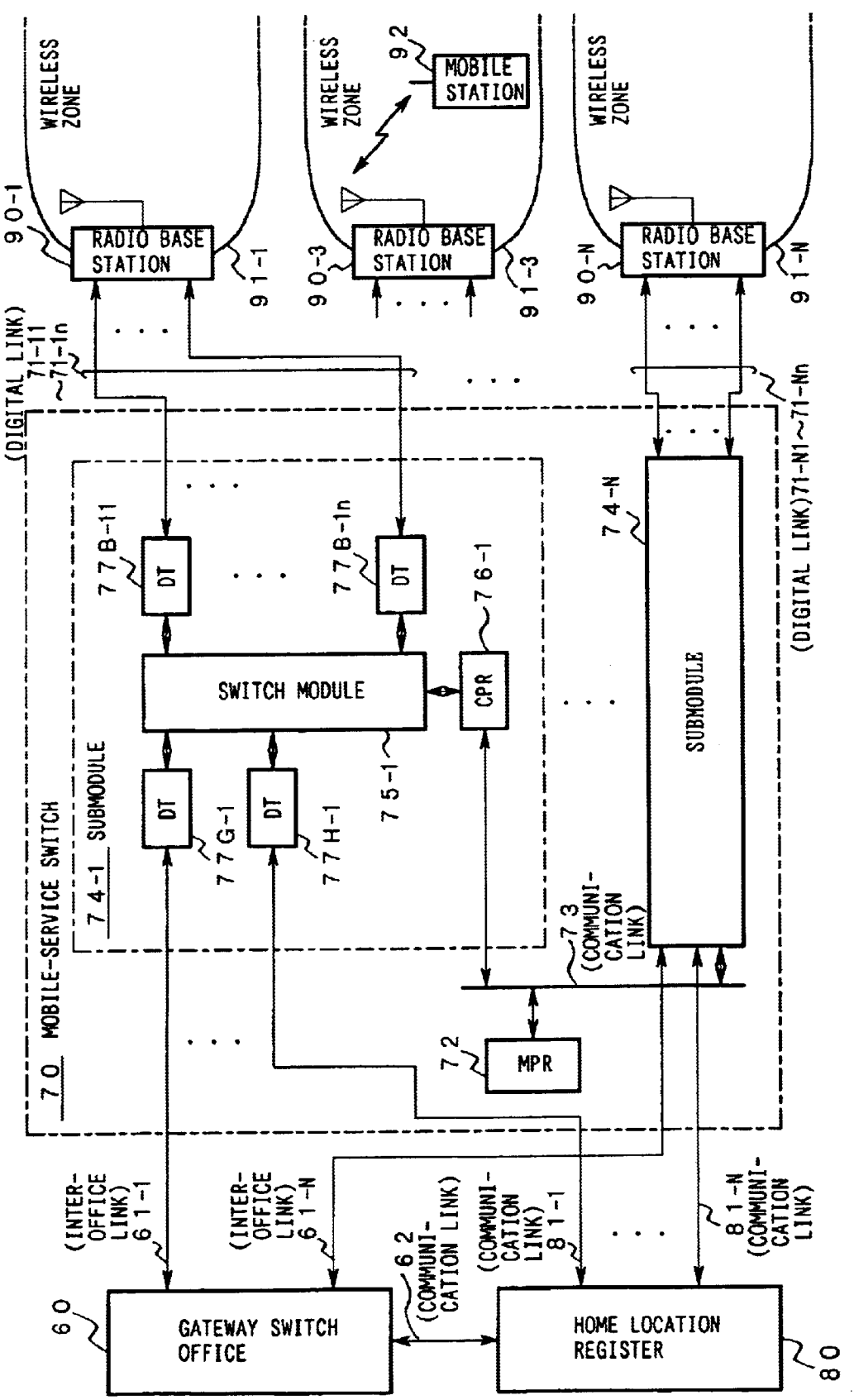
FIG. 17 shows an example configuration of a mobile communication system to which a distributed processing scheme is applied.
Figure 18:
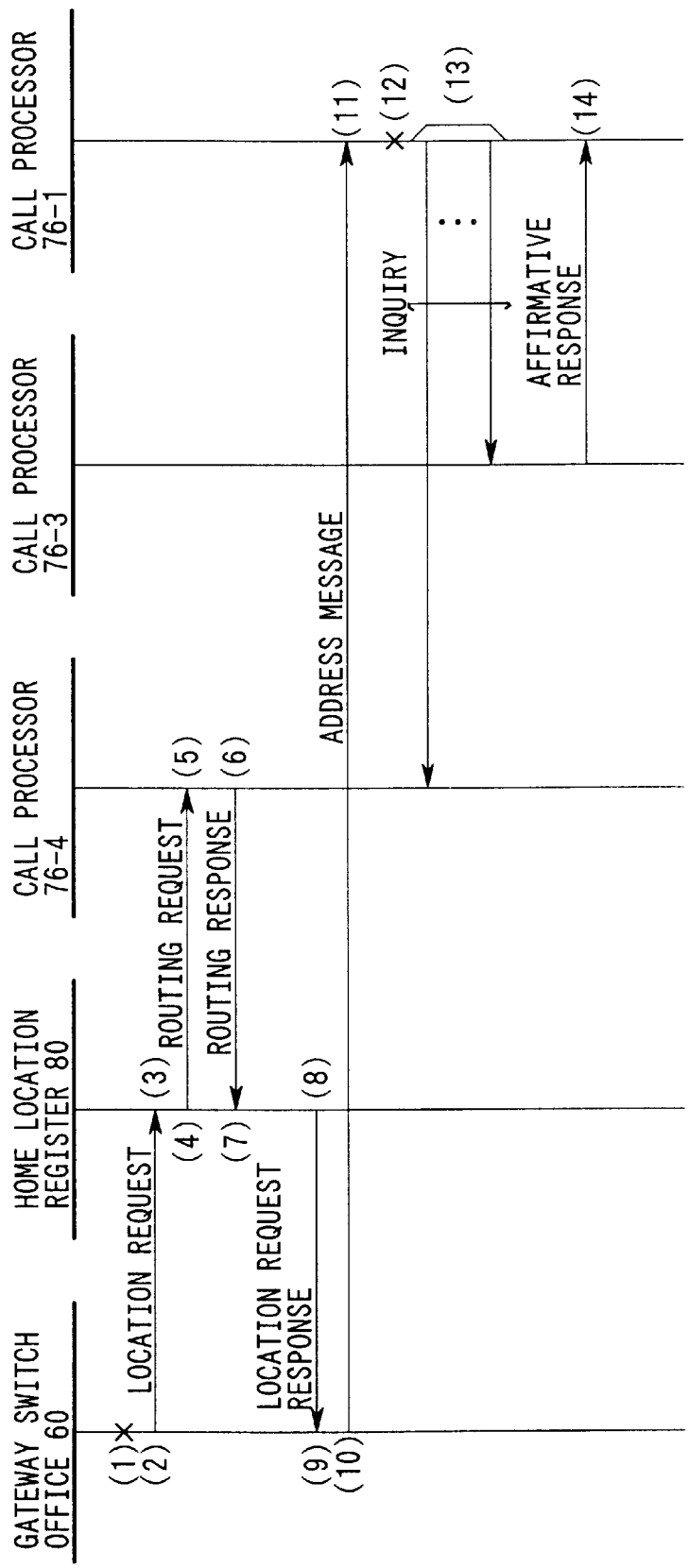
FIG. 18 is a chart showing an operation of the conventional example.

The embodiments are different in configuration from the conventional example of FIG. 17 in that a gateway switch office 60A is provided in place of the gateway switch office 60, a mobile-service switch office 70A is provided in place of the mobile-service switch office 70, and a home location register 80A is provided in place of the home location register 80.

The mobile-service switch office 70A is different in configuration from the mobile-service office 70 in that submodules 74A-1 to 74A-N having respective call processors 41-1 to 41-N in place of the call processors 76-1 to 76-N are provided in place of the submodules 74-1 to 74-N.

For the sake of simplicity, in each embodiment, it is assumed as in the case of the conventional example that a termination call to be terminated at the mobile station 92 visiting the wireless zone 91-3 has occurred and a description will be made of a procedure of processing that is performed by the respective sections during the course of call processing and a channel control that relate to the termination call.

Figure 5:
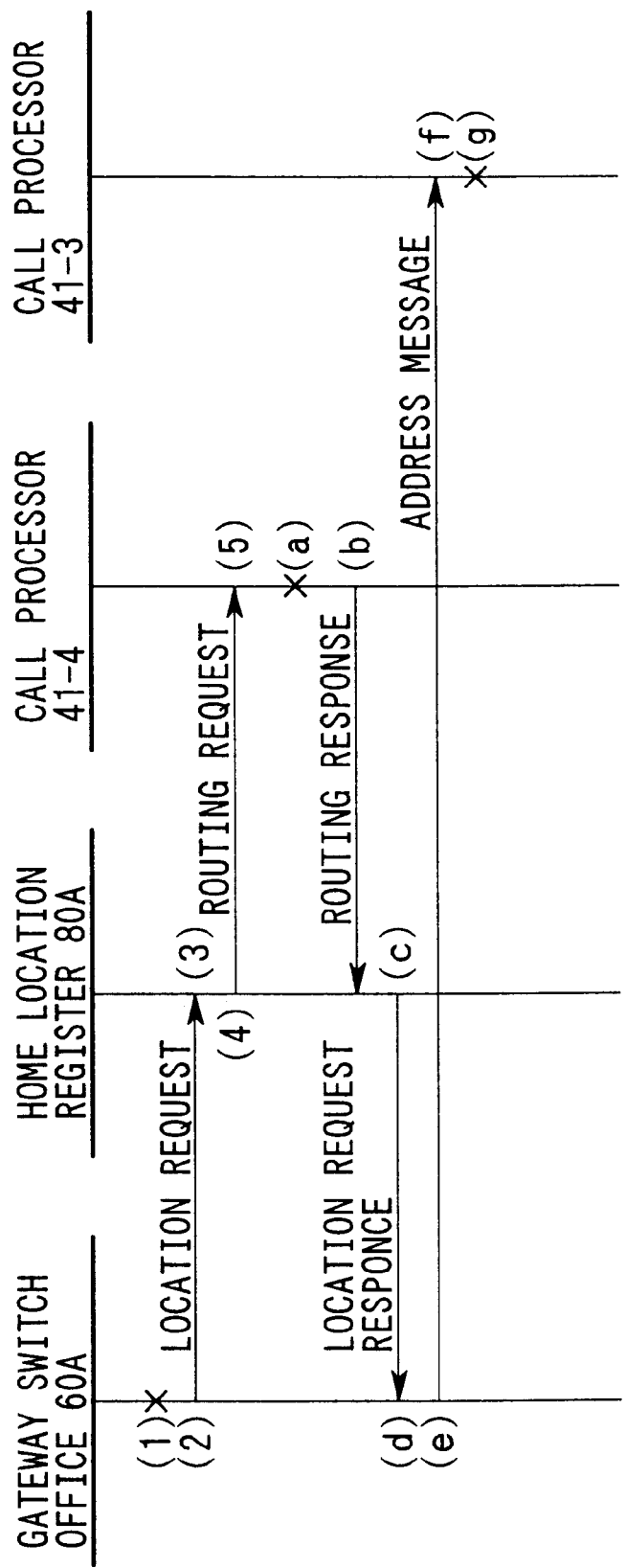
FIG. 5 is a chart showing an operation of a first embodiment of the invention.

FIG. 5 is a chart showing an operation of a first embodiment of the invention. The specific operations in FIG. 5 that are the same as in the conventional example are given the same reference symbols as in FIG. 1,8 and will not be described.

Figure 6:
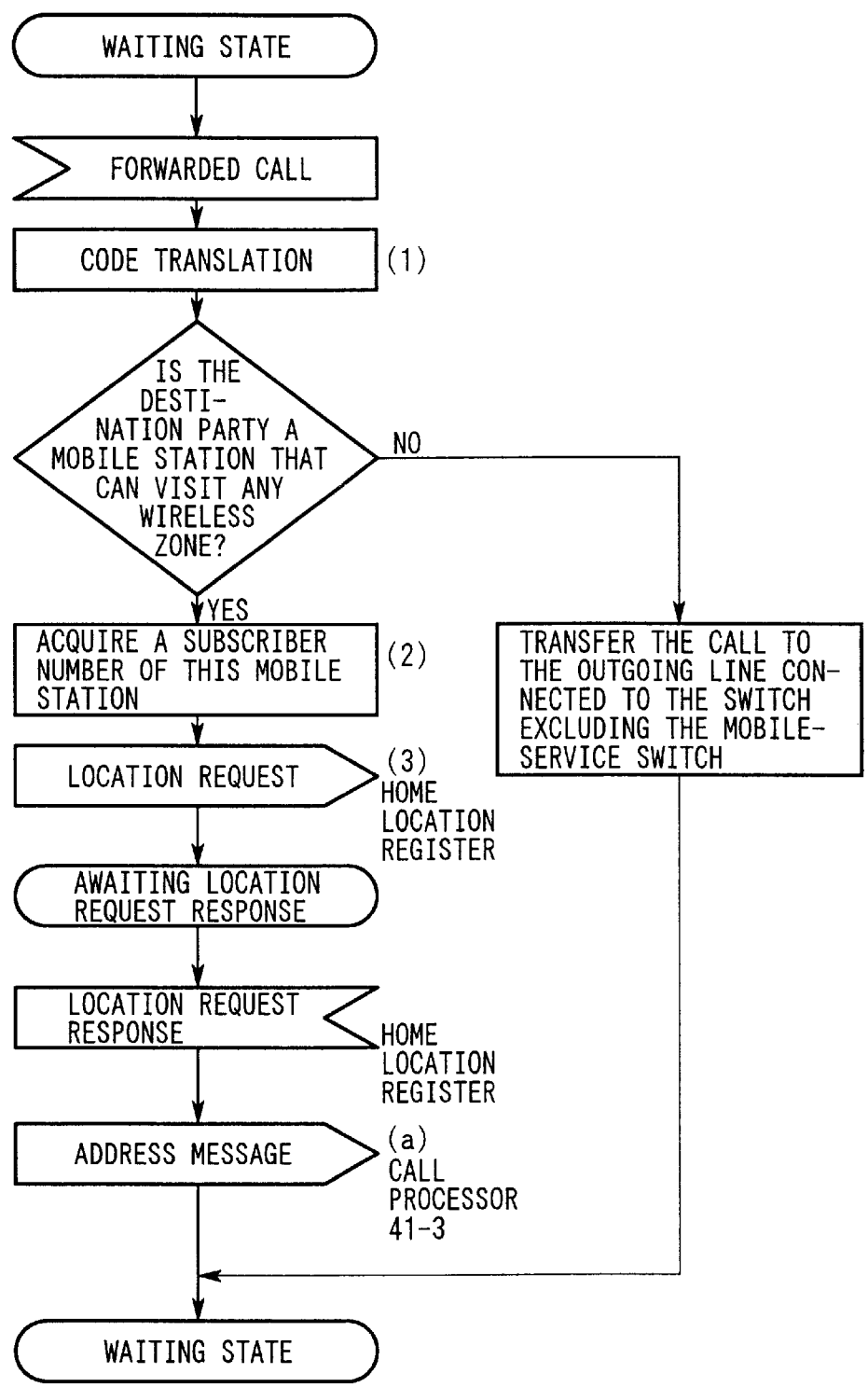
FIG. 6 is an operation flowchart of a gateway switch office according to the first embodiment.
Figure 19:
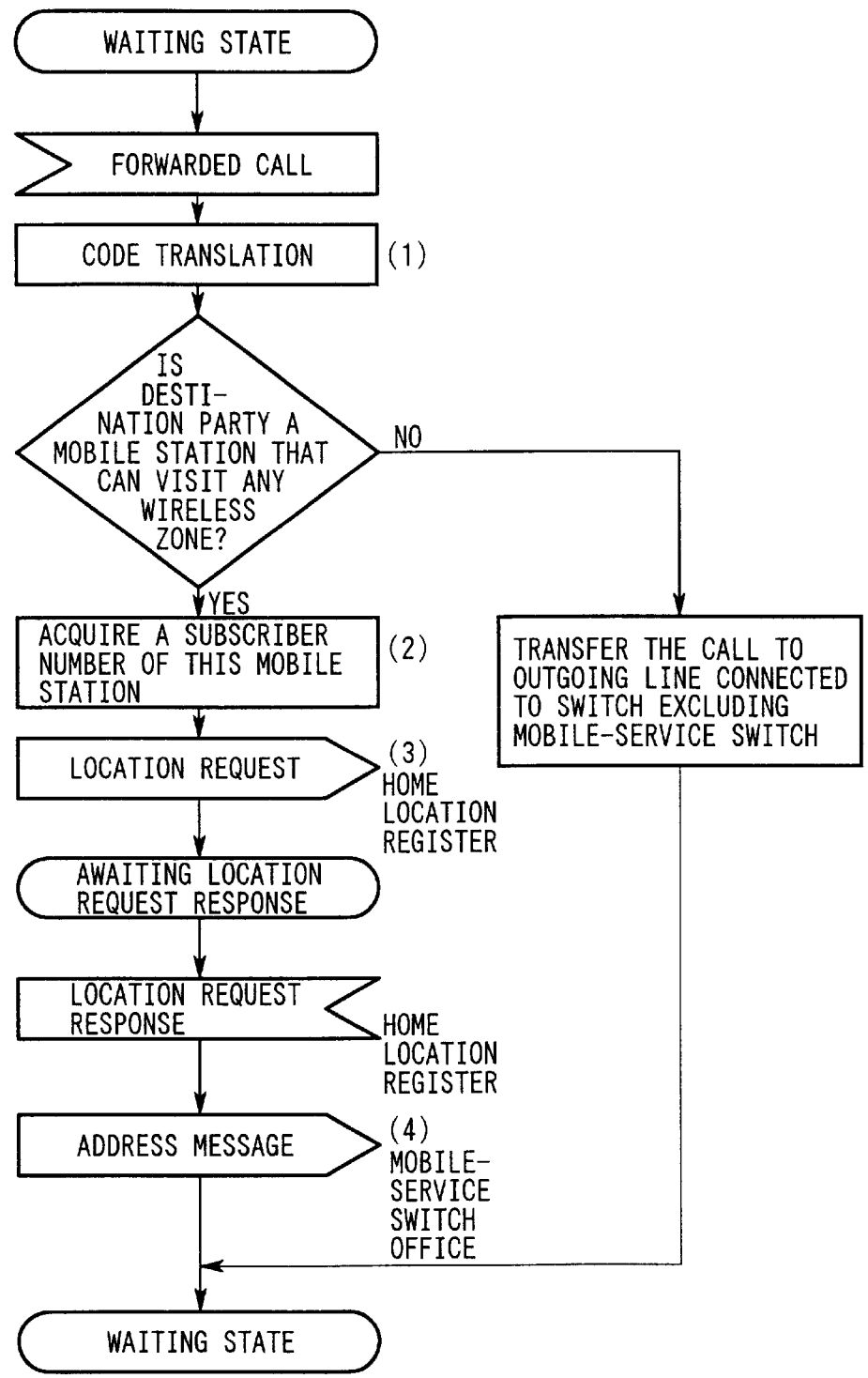
FIG. 19 is an operation flowchart of a gateway switch office in the conventional example.

FIG. 6 is an operation flowchart of the gateway switch office according to the first embodiment of the invention. The steps in FIG. 6 that are the same as in the conventional example. are given the same reference symbols as in FIG. 19 and will not be described.

Figure 7:
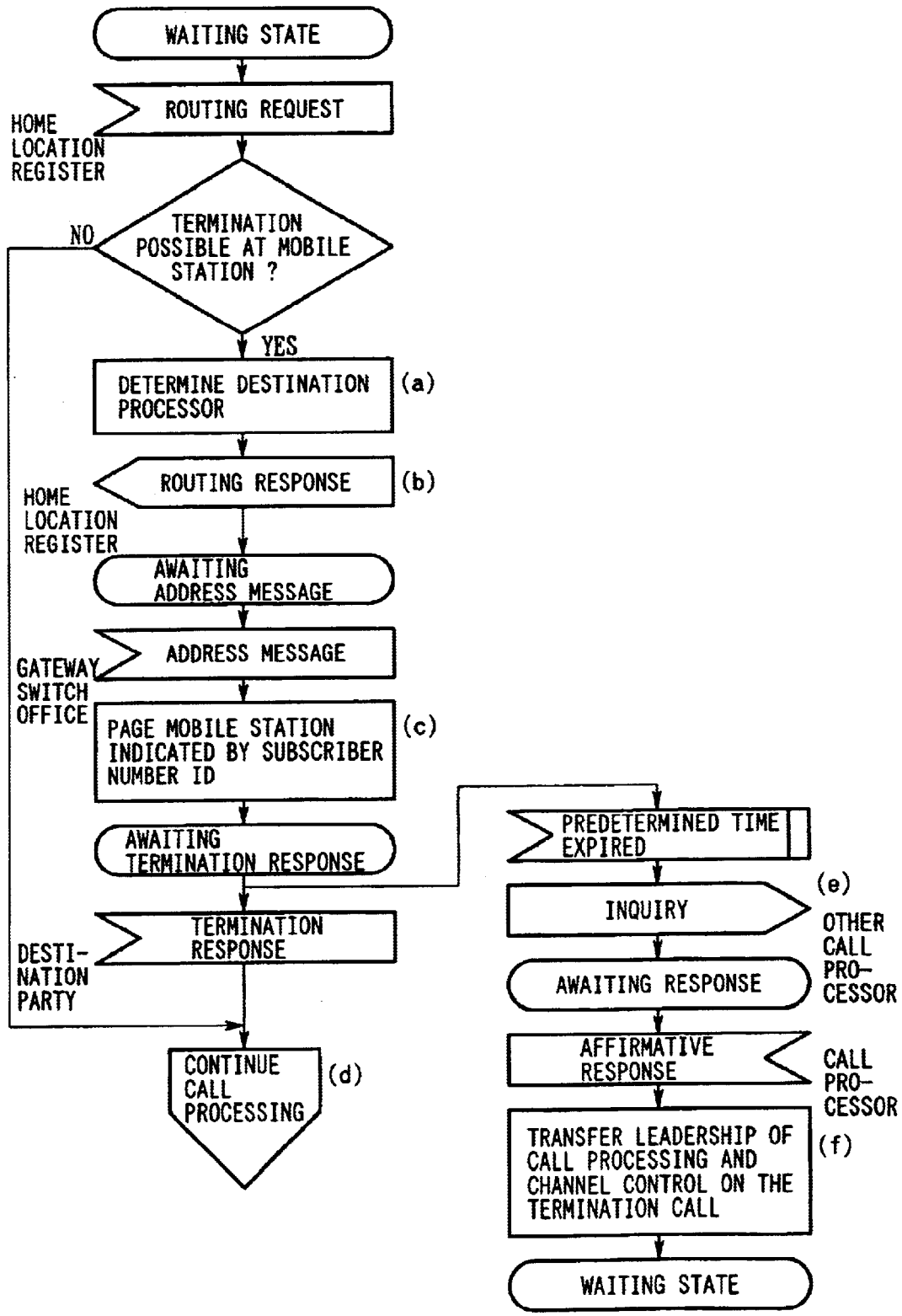
FIG. 7 is an operation flowchart of a mobile-service switch office according to the first embodiment.
Figure 21:
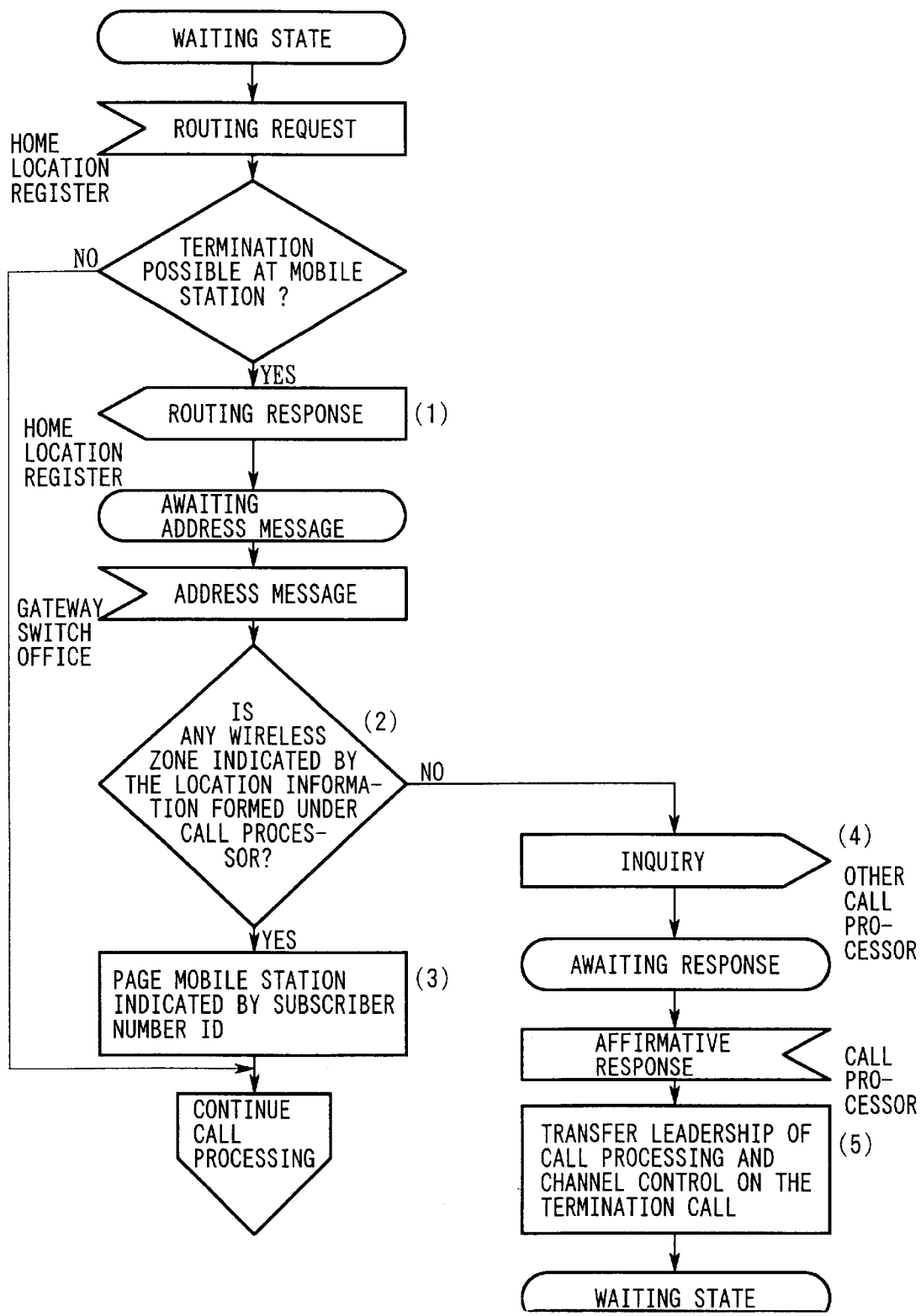
FIG. 21 is an operation flowchart of a mobile-service switch office in the conventional example.

FIG. 7 is an operation flowchart of the mobile-service switch office according to the first embodiment of the invention. The steps in FIG. 7 that are the same as in the conventional example are given the same reference symbols as in FIG. 21 and will not be described.

An operation of the first embodiment of the invention will be described below with reference to FIGS. 4–7.

This embodiment is different from the conventional example in the following processing procedures of the gateway switch office 60A, the home location register 80A, and the call processors 41-1 to 41-N.

When the above-mentioned termination call has occurred, the gateway switch office 60A generates a location request including the subscriber number ID of the mobile station 92 to be a destination party of the termination call and sends the generated location request to the home location register 80A via the communication link 62 (indicated by symbol (2) in FIG. 5; step (3) in FIG. 6).

The home location register 80A acquires, from the database, a visit-zone identifier (hereinafter referred to simply as "location information") and a switch identification number MSCID that constitute a combination together with the subscriber number ID included in the location request (indicated by symbol (3) in FIG. 5).

Then, the home location register 80A sends a routing request including the subscriber number ID and the location information to the mobile-service switch office (for simplicity, it is assumed to be the mobile-service switch office 70A) indicated by the switch identification number MSCID (indicated by symbol (4) in FIG. 5).

Among the communication links 81-1 to 81-N, a communication link to be used for the transmission of the routing request is selected by both or one of an operating system and a driver that are provided in the home location register 80A, in the same manner as in the conventional example.

Therefore, if the routing request is sent from the home location register 80A to the communication link 81-4, for example, in the mobile-service switch office 70A it is given to the call processor 41-4 via the digital trunk 77H-4 and the switch module 75-4.

Upon recognition of the routing request, the call processor 41-4 judges whether or not termination is possible at the mobile station 92 indicated by the subscriber number ID by recognizing a state or information described below based on the subscriber number ID and the location information included in the routing request (indicated by symbol (5) in FIG. 5).

A state that a certain call occurred in advance at the mobile station 92 indicated by the subscriber number ID and it still continues to exist.

Whether or not there is a factor (e.g., a subscriber class or subscriber data) that prevents the mobile station 92 from responding to paging of the local station.

Whether or not there is a factor (e.g., congestion or a trouble in the radio base station) that prevents paging of the mobile station 92 in the wireless zone (for simplicity, it is assumed to be the wireless zone 91-3) indicated by the location information.

A procedure of processing to be performed by the call processor 41-4 singly or in cooperation with the main processor 72 to recognize a state or information described above does not relate to the invention and can be realized by using various known techniques, and hence it will not be described.

When the judgment result is true, the call processor 41-4 determines, among the call processors 41-1 to 41-N, a call processor (hereinafter referred to as "termination processor") that is to cooperate with a radio base station forming a wireless zone where the mobile station 92 as a destination party of the termination call concerned actually visits or visits with a high possibility by checking all or part of the following items (indicated by symbol (a) in FIG. 5; step (a) in FIG. 7):

A load distribution of the call processors 41-1 to 41-N.

Subscriber data of the mobile station 92.

A geographical distribution (zone configuration) of the wireless zones 91-1 to 91-N.

A traffic distribution of the wireless zones 91-1 to 91-N.

Operating statuses of the radio base stations 90-1 to 90-N.

A history of calls that occurred in advance in the mobile station 92.

The call processor 41-4 may determine itself as a termination processor.

Then, the call processor 41-4 assigns unique call identification information TLDN to the termination call concerned, and generates a routing response including, together with the call identification information TLDN and the above-mentioned subscriber number ID and location information, an identifier of the determined termination processor (hereinafter referred to simply as "processor identifier"). Further, the call processor 41-4 sends the generated routing response to the home location register 80A via the switching module 75-4, the digital trunk 77H-4, and the communication link 81-4 (indicated by symbol (b) in FIG. 5; step (a) in FIG. 7).

For the sake of simplicity, in the following description, it is assumed that the processor identifier is "3" representing the call processor 41-3 to be dedicated for processing relating the wireless zone 91-3 where the mobile station 92 visits.

Upon recognition of the routing response, the home location register 80A generates a location request response including the call identification information TLDN, the subscriber number ID, the location information, and the processor identifier that are included in the routing response and sends the generated location request response to the gateway switch office 60A via the communication link 62 (indicated by symbol (c) in FIG. .5).

Upon recognition of the location request response, the gateway switch office 60A generates an address message including the call identification information TLDN, the subscriber number ID, and the location information that are included in the location request response (indicated by symbol (d) in FIG. 5).

Then, the gateway switch office 60A sends the generated address message to the mobile-service switch office 70A via the inter-office link 61-3 corresponding to the processor identifier that is included in the location request response among the inter-office links 61-1 to 61-N (indicated by symbol (e) in FIG. 5; step (a) in FIG. 6).

In the mobile-service switch office 70A, the call processor 41-3 accepts the address message supplied via the digital trunk 77G-3 and the switch module 75-3 (indicated by symbol (f) in FIG. 5).

The call processor 41-3 acquires the call identification information TLDN, the subscriber number ID, and the location information included in the address message, and pages the mobile station 92 indicated by the subscriber number ID by cooperating with the radio base station 90-3 via the digital trunks 77B-31 to 77B-3n and the digital links 71-31 to 71-3n (indicated by symbol (g) in FIG. 5; step (c) in FIG. 7).

When the call processor 41-3 has recognized a termination response sent from the mobile station 92 that has responded to the paging, the call processor 41-3 continues the call processing and channel control for the termination call concerned (step (d) in FIG. 7).

However, when the call processor 41-3 cannot recognize such a termination response in a predetermined period in conformity with the channel control procedure, the call processor 41-3 sequentially inquires of the other call processors 41-1, 41-2, 41-4, . . . , 41-N via the communication link 73 and the main processor 72 whether the wireless zones formed under the respective call processors coincide with the wireless zone indicated by the location information that is included in the address message (step (e) in FIG. 7).

When recognizing, from among the call processors 411, 41-2, 41-4, . . . , 41-N, a call processor from which an affirmative answer to the above inquiry has been received, the call processor 41-3 passes the call identification information TLDN and the subscriber number ID to the thus-recognized call processor and thereby transfers to it the leadership of the call processing and the channel control relating to the termination call concerned (step (f) in FIG. 7).

That is, among the call processors 41-1 to 41-N provided in the mobile-service switch office 70A, a call processor that has been given a routing request from the home location register 80A determines a call processor that is to perform call set-up and a channel control relating to a wireless zone where the mobile station 92 as a destination party visits at a strong possibility and the gateway switch office 60A can give an address message directly to the thus-determined call processor.

Therefore, according to this embodiment, the probability that a call processor that has been given an address message performs call processing on a termination call concerned becomes much higher than in the conventional example, the efficiency of utilization of resources and the service quality are inhibited from being lowered by a small value of the above probability and the running cost is reduced.

In this embodiment, the routing request including, together with the call identification information TLDN, the subscriber number ID, the location information, and the processor identifier is sent from the call processor 41-4 to the home location register 80A. However, for example, the subscriber number ID, the location information, and the processor identifier may be integrated with the call identification information TLDN in a manner shown in FIG. 8.

Figure 9:
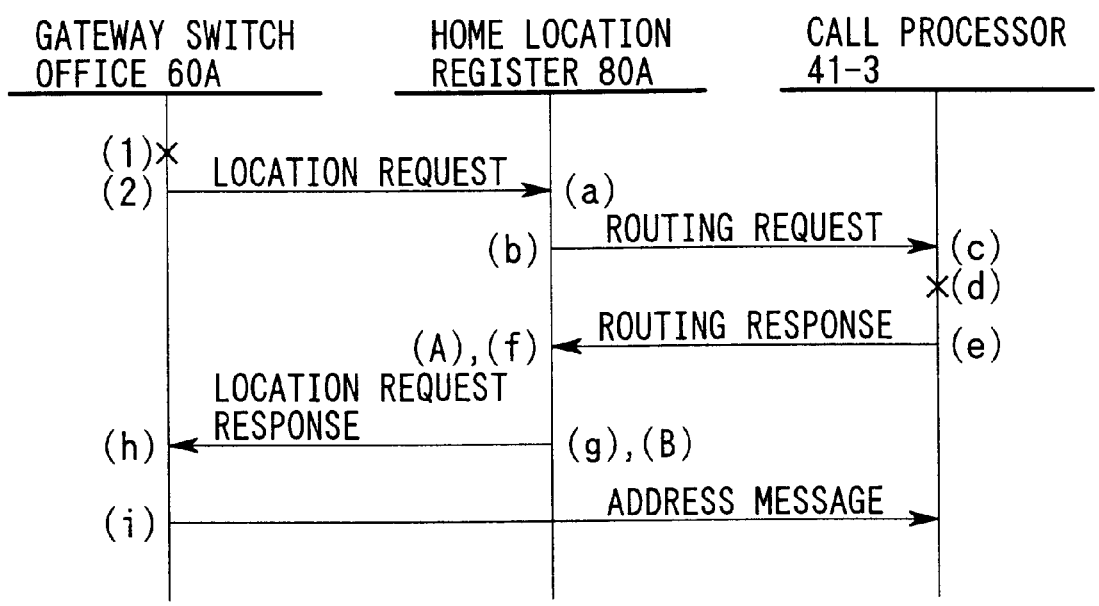
FIG. 9 is a chart showing operations of second and third embodiments of the invention.

FIG. 9 is a chart showing operations of second and third embodiments of the invention. The specific operations in FIG. 9 that are the same as in the first embodiment are given the same reference symbols as in FIG. 5 and will not be described.

Figure 10:
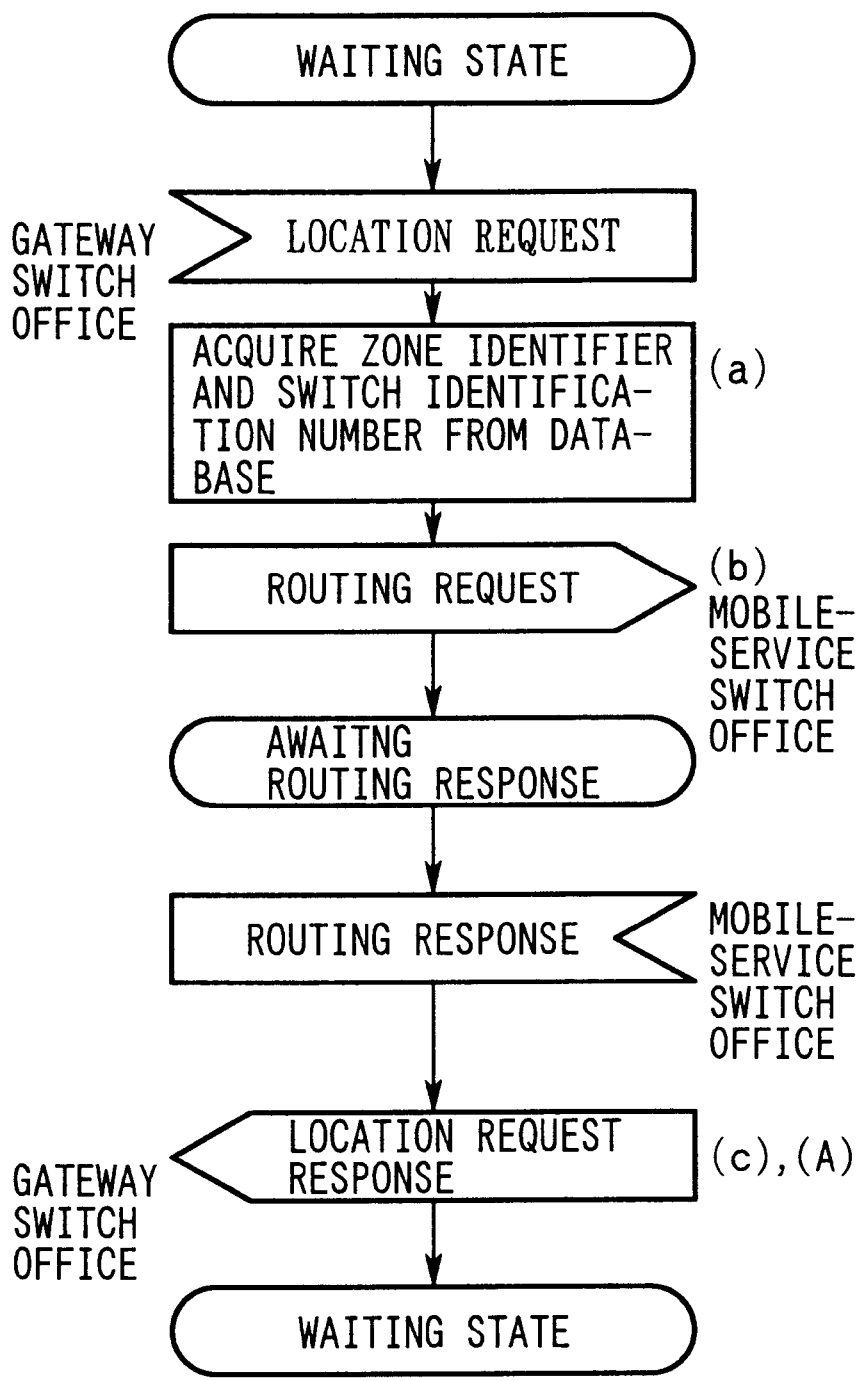
FIG. 10 is an operation flowchart of a home location register according to the second and third embodiments.
Figure 11:
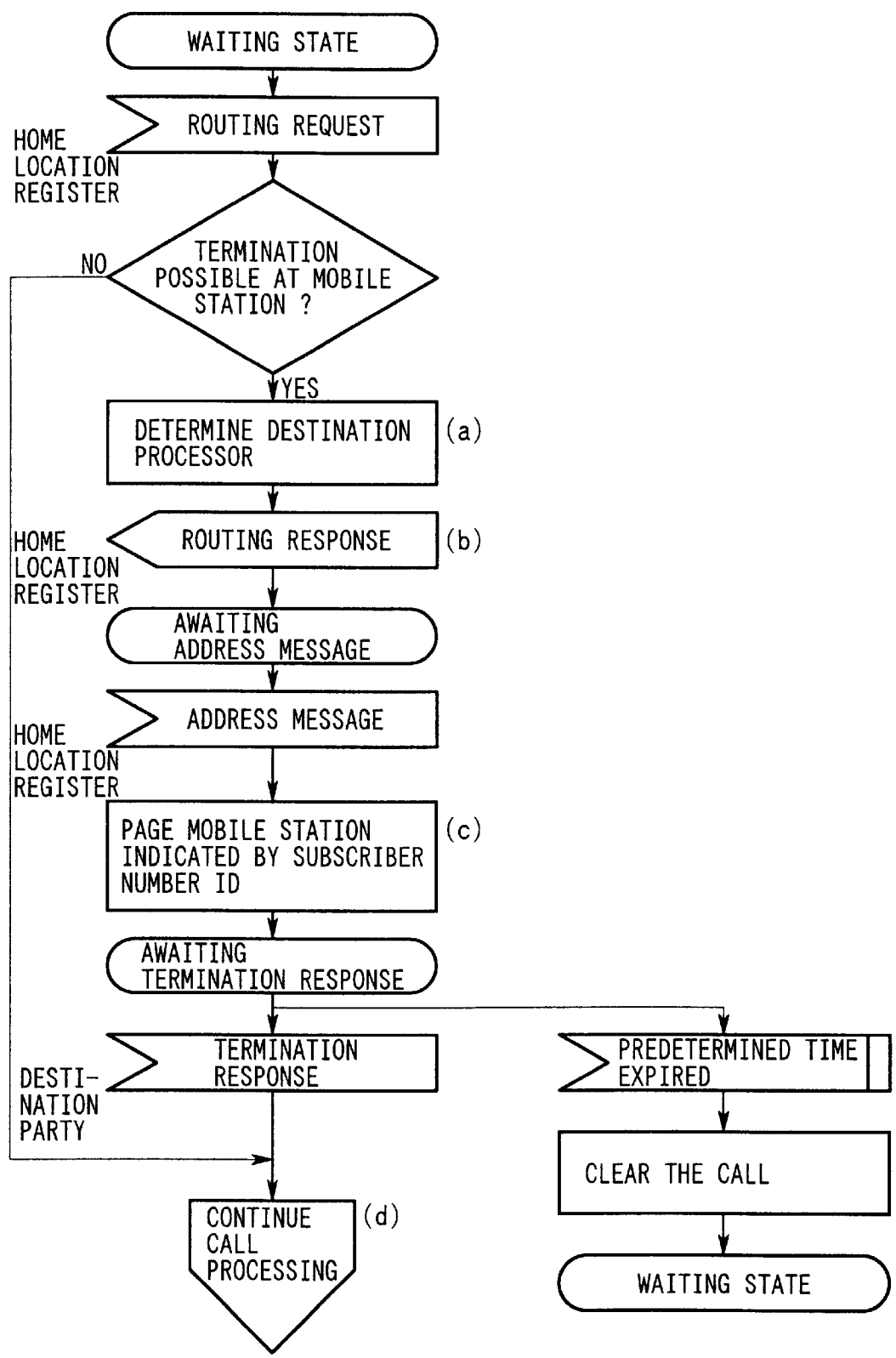
FIG. 11 is an operation flowchart of a mobile-service switch office according to the second and third embodiments.

FIG. 10 is an operation flowchart of the home location register according to the second and third embodiments. FIG. 11 is an operation flowchart of the mobile-service switch office according to the second and third embodiments.

Figure 20:
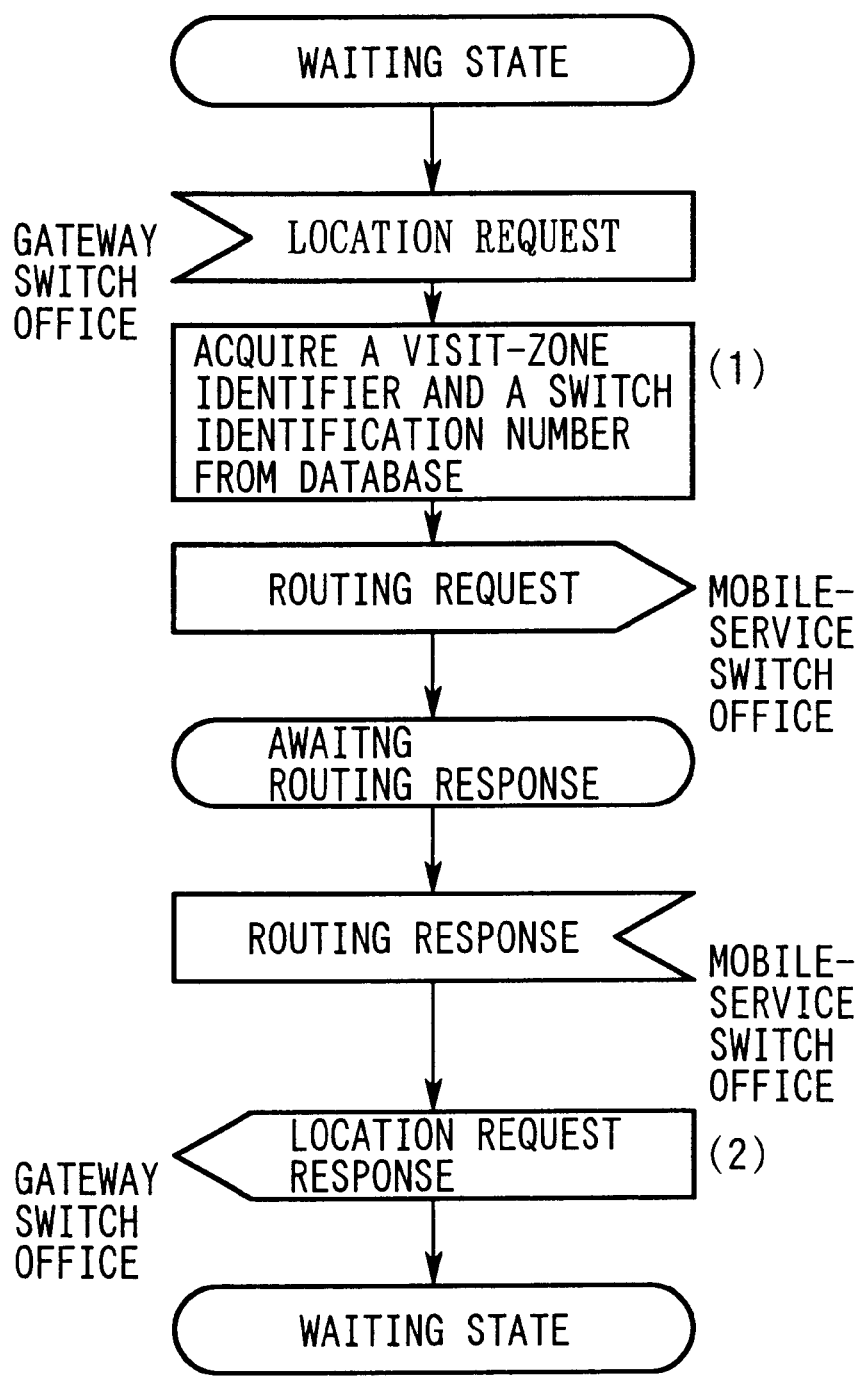
FIG. 20 is an operation flowchart of a home location register in the conventional example.

The steps in FIGS. 10 and 11 that are the same as in the first embodiment are given the same reference symbols as in FIG. 20 and 7 and will not be described.

An operation of the second embodiment of the invention will be described below with reference to FIGS. 4, 6, and 9–11.

This embodiment is characterized by the following procedure of processing that is performed in cooperation by the home location register 80A, the gateway switch office 60A, and the call processors 41-1 to 41-N.

Figure 12:
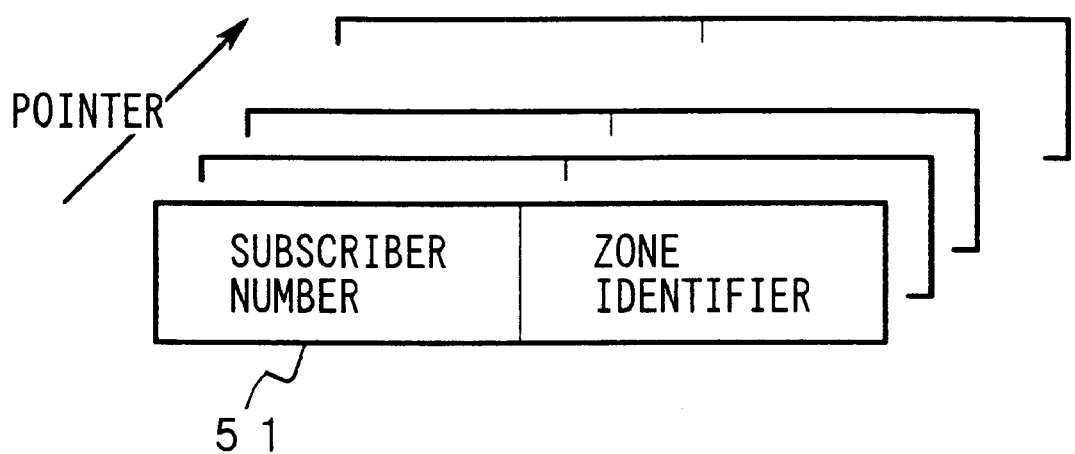
FIG. 12 shows the structure of a current zone register.

As shown in FIG. 12, the home location register 80A has, as a database, a current zone register 51 in which combinations of a subscriber number and a zone identifier indicating, among the wireless zones 91-1 to 91-N, a wireless zone where the associated mobile station visits are registered for respective mobile stations each being located in one of the wireless zones 91-1 to 91-N, and that is updated when necessary by the home location register 80A's cooperating with the mobile-service switch office 70A according to a procedure of location registration.

Processing performed by the individual sections during the course of updating the current zone register 51 is not an important feature of the invention and can be realized by using various known techniques, and hence it will not be described.

When a termination call to be terminated at the mobile station 92 visiting the wireless zone 91-3 has occurred (indicated by symbol (1) in FIG. 9), the gateway switch office 60A generates a location request including the subscriber number ID of the mobile station 92 and sends the generated location request to the home location register 80A via the communication link 62 (indicated by symbol (2) in FIG. 9; step (3) in FIG. 6).

The home location register 80A acquires, from the database, a zone identifier and a switch identification number MSCID that constitute a combination (described above) together with the subscriber number ID that is included in the location request (indicated by symbol (a) in FIG. 9; step (a) in FIG. 10).

Then, the home location register 80A sends a routing request including the subscriber number ID and the zone identifier to the communication link 81-3 corresponding to the call processor 41-3 that is to perform a channel control relating to the wireless zone indicated by the zone identifier among the communication links 81-1 to 81-N formed between the home location register 80A and a mobile-service switch office (for simplicity, it is assumed to be the mobile-service switch office 70A) indicated by the switch identification number MSCID (indicated by symbol (b) in FIG. 9; step (b) in FIG. 10).

Therefore, the routing request is transmitted to the call processor 41-3 via the communication link 81-3, the digital trunk 77H-3, and the switch module 75-3.

Upon recognition of the routing request, the call processor 41-3 judges whether termination is possible at the mobile station 92 indicated by the subscriber number ID by recognizing a state or information described below based on the subscriber number ID and the location information included in the routing request (indicated by symbol (c) in FIG. 9).

A state that a certain call occurred in advance at the mobile station 92 indicated by the subscriber number ID and it still continues to exist.

Whether there exists a factor (e.g., a subscriber class or subscriber data) that prevents the mobile station 92 from responding to paging of the local station.

Whether there exists a factor (e.g., congestion or a trouble in the radio base station) that prevents paging of the mobile station 92 in the wireless zone (for simplicity, it is assumed to be the wireless zone 91-3) indicated by the location information.

A procedure of processing to be performed by the call processor 41-3 singly or in cooperation with the main processor 72 to recognize a state or information described above does not relate to the invention and can be realized by using various known techniques, and hence it will not be described.

When the judgment result is true, the call processor 41-3 checks all of part of the following items and confirms that the mobile station 92 as a destination party is in such a state that paging will be permitted. Further, the call processor 41-3 determines itself as a termination processor (described above) (indicated by symbol (d) in FIG. 9; step (a) in FIG.

A load distribution of the call processors 41-1 to 41-N.

Subscriber data of the mobile station 92.

A geographical distribution (zone configuration) of the wireless zones 91-1 to 91-N.

A traffic distribution of the wireless zones 91-1 to 91-N.

Operating statuses of the radio base stations 90-1 to 90-N.

A history of complete calls that occurred in advance in the mobile station 92.

Then, the call processor 41-3 assigns unique call identification information TLDN to the termination call concerned, and generates a routing response including, together with the call identification information TLDN and the above-mentioned subscriber number ID and location information, an identifier of the termination processor (hereinafter referred to simply as "processor identifier"). Further, the call processor 41-3 sends the generated routing response to the home location register 80A via the switching module 75-3, the digital trunk 77H-3, and the communication link 81-3 (indicated by symbol (e) in FIG. 9; step (b) in FIG. 11).

Upon recognition of the routing response, the home location register 80A generates a location request response including the call identification information TLDN, the subscriber number ID, the location information, and the processor identifier that are included in the routing response (step (f) in FIG. 9) and sends the generated location request response to the gateway switch office 60A via the communication link 62 (indicated by symbol (g) in FIG. 9; step (c) in FIG. 10).

Upon recognition of the location request response, the gateway switch office 60A generates an address message including the call identification information TLDN, the subscriber number ID, and the location information that are included in the location request response (indicated by symbol (h) in FIG. 9).

Then, the gateway switch office 60A sends the generated address message to the mobile-service switch office 70A via the inter-office link 61-3 corresponding to the processor identifier that is included in the location request response among the inter-office links 61-1 to 61-N (indicated by symbol (i) in FIG. 9; step (a) in FIG. 6).

In the mobile-service switch office 70A, the call processor 41-3 accepts the address message via the digital trunk 77G-3 and the switch module 75-3 and performs processing according to the same procedure as in the first embodiment (steps (c) and (d) in FIG. 11).

That is, the wireless zone where the mobile station 92 to be a destination party of the termination call is to be paged and the call processor that is to perform a channel control and call set-up relating to the above wireless zone are given with a lead by the home location register 80A.

Therefore, according to this embodiment, the location information that is accumulated in the home location register 80A is used more effectively than in the conventional example and the first embodiment and an address message is given directly to a call processor that is to perform call set-up and a channel control for a wireless zone where a mobile station as a destination party visits.

In this embodiment, the routing request and the address message are sent to the call processor 41-3 via the communication link 81-3 and the inter-office link 61-3, respectively, and processed individually by the call processor 41-3.

However, the invention is not limited to such a configuration. The call set-up may be simplified and increased in efficiency in such a manner that the processor identifier that has been determined by the home location register 80A is transmitted to the gateway switch office 60A via the communication link 62 and a message including both of the routing request and the address message is sent from the gateway switch office 60A to the call processor 41-3 via the inter-office link 61-3.

An operation of the third embodiment of the invention will be described below with reference to FIGS. 4 and 9–11.

This embodiment is different from the second embodiment in the following procedure of processing that is performed in cooperation by the home location register 80A and the call processor 41-3.

Upon recognition of the routing response that was sent from the call processor 41-3 and supplied via the switch module 75-3, the digital trunk 77H-3, and the communication link 81-3, the home location register 80A generates a location request response including, together with the call identification information TLDN, the subscriber number ID, and the processor identifier that are included in the routing response, a zone identifier that is recorded in the current zone register 51 as corresponding to the subscriber number ID (indicated by symbol (A) in FIG. 9) and sends the generated location request response to the gateway switch office 60A via the communication link 62 (indicated by symbol (B) in FIG. 9; step (A) in FIG. 10).

Upon recognition of the location request response, the gateway switch office 60A generates an address message including the call identification information TLDN, the subscriber number ID, and the location information that are included in the location request response according to the same procedure as in the second embodiment (indicated by symbol (h) in FIG. 9), and sends the generated address message to the mobile-service switch office 70A via the inter-office link 61-3 (indicated by symbol (i) in FIG. 9).

Processing that is performed by the mobile-service switch office 70A (call processor 41-3) in response to the address message is the same as in the second embodiment, and hence will not be described.

That is, the zone identifier indicating the wireless zone 91-3 where the mobile station 92 as a destination party visits is obtained by the home location register 80A by referring to the current zone register 51, is added to the location request response, and is not included in the routing response that is sent from the call processor 41-3 even if the zone identifier is sent to the call processor 41-3 in a state that it is added to the routing request.

In this manner, according to this embodiment, since the zone identifiers registered in the current zone register 51 are referred to effectively, the amount of information to be transferred from the processors 41-1 to 41-N to the home location register 80A can be made smaller than in the second embodiment. Therefore, the transmission efficiency of the communication links 81-1 to 81-N can be increased.

In this embodiment, a zone identifier registered in the current zone register 51 is referred to two times during the course of call set-up for an individual call.

However, the invention is not limited to such a configuration. For example, the following configuration may be used in a case where there is a possibility that one of the zone identifiers registered in the current zone register 51 is updated in a period from a time point when it was referred to add it to a routing request to a time point when it will be referred to again to add it to a location request response and the period when the updating is suspended is unduly long.

Figure 13:
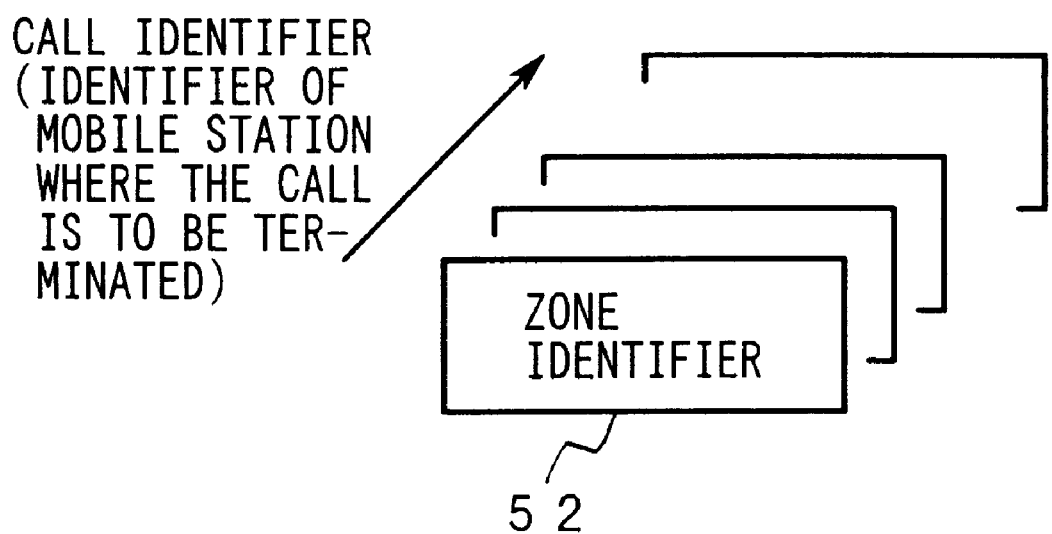
FIG. 13 shows the structure of a zone register.

As shown in FIG. 13, a zone register 52 is provided to register therein, for respective calls or mobile stations, zone identifiers that were referred to in advance.

Sufficient reliability is secured by adding a zone identifier registered in the zone register 52 to a location request response.

In the second and third embodiments, the home location register 80A is provided with the current zone register 51 in which combinations of a subscriber number and a zone identifier are registered in advance for respective mobile stations.

However, the structure of the current zone register 51 is not limited to the above one. For example, a processor identifier indicating a call processor or an identifier indicating an inter-office link may be registered in place of a corresponding zone identifier as long as the corresponding relationship among the inter-office links 61-1 to 61-N, the call processors 41-1 to 41-N, and the wireless zones 91-1 to 91-N is provided as known information and hence is recognizable.

In the second and third embodiments, the home location register 80A is provided with the current zone register 51 and the zone register 52.

However, where the wireless zones 91-1 to 91-N are formed under the respective call processors 41-1 to 41-N, a processor identifier indicating a call processor may be registered or stored in the current zone register 51 and the zone register 52 in place of a corresponding zone identifier.

Where the number of wireless zones to be formed under the call processors 41-1 to 41-N is larger than the number N of call processors and the number of wireless zones to be formed under each of the call processors 41-1 to 41-N is variable, adaptation may be made to a combination of the numbers of wireless zones by storing combinations of zone identifiers in the current zone register 51 and the zone register 52.

Further, the inter-office links 61-1 to 61-N are provided between the mobile-service switch office 70A and the gateway switch office 60A and the communication links 81-1 to 81-N are provided between the mobile-service switch office 70A and the home location register 80A.

However, where one or both of the inter-office links 61-1 to 61-N and the communication links 81-1 to 81-N are provided redundantly to secure sufficient reliability or attain load distribution, an identifier of one or both of an inter-office link and a communication link for forming a desired signaling link and data link, respectively, with an individual call processor that is to perform a channel control or call set-up for a wireless zone where a mobile station as a destination party visits may be registered in the current zone register 51 and the zone register 52 in place of a corresponding zone identifier or processor identifier and may be updated when necessary.

Figure 14:
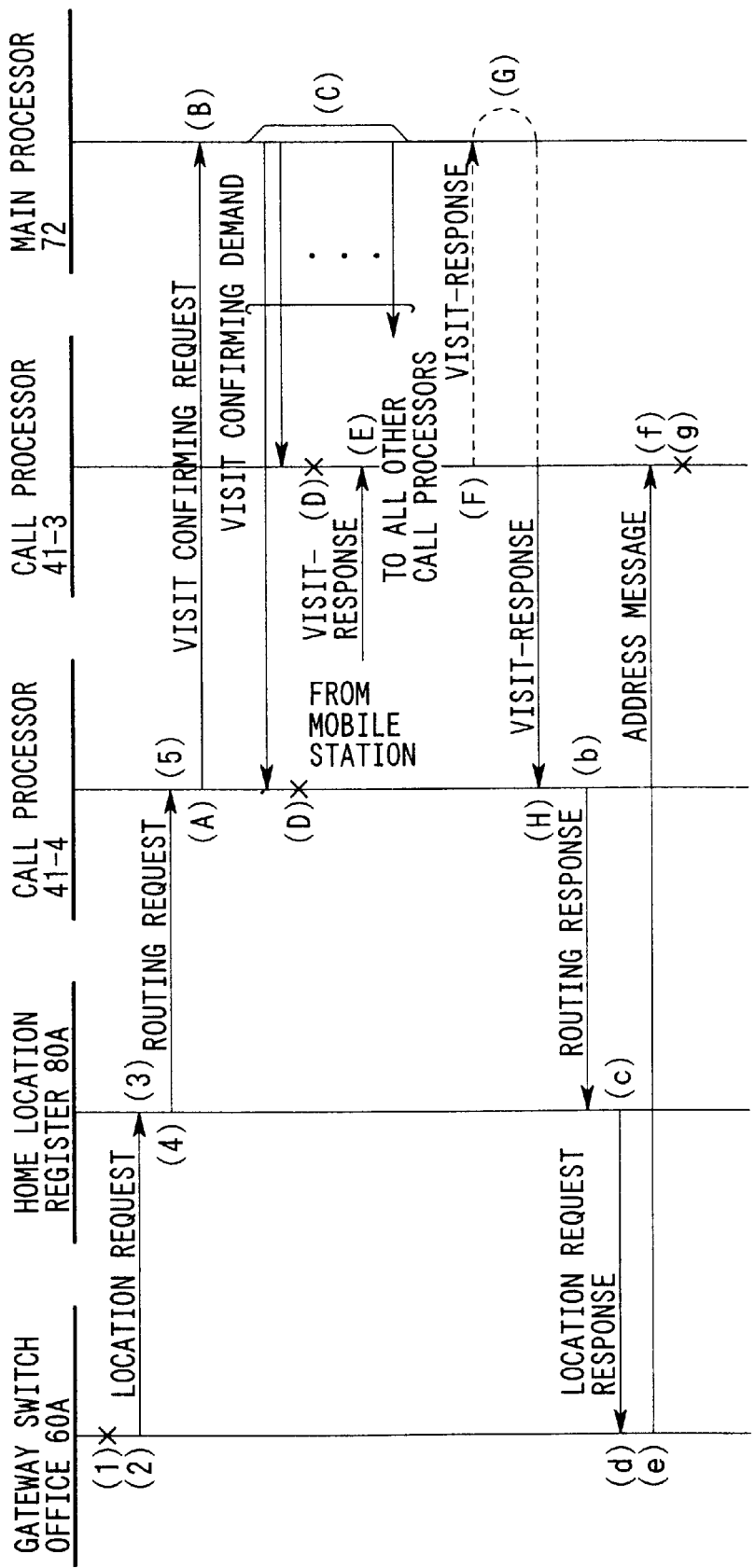
FIG. 14 is a chart showing operations of fourth and fifth embodiments of the invention.

FIG. 14 is a chart showing operations of fourth and fifth embodiments of the invention. The specific operations in FIG. 14 that are the same as in the first embodiment are given the same reference symbols as in FIG. 5 and will not be described.

Figure 15:
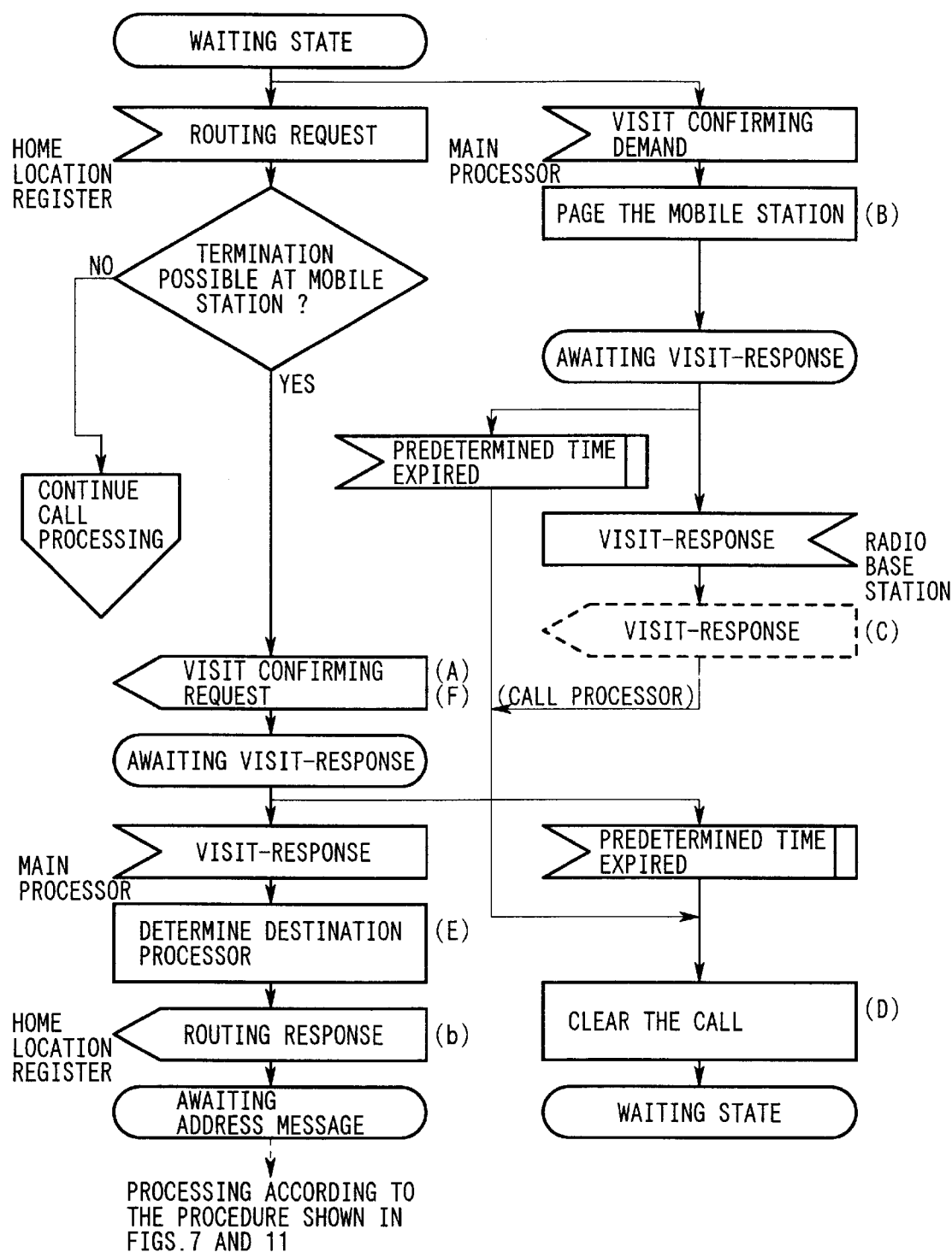
FIG. 15 is an operation flowchart of a mobile-service switch office according to the fourth and fifth embodiments.

FIG. 15 is an operation flowchart of the mobile-service switch office according to the fourth and fifth embodiments of the invention. The steps in FIG. 15 that are the same as in the first embodiment are given the same reference symbols as in FIG. 7 and will not be described.

An operation of the fourth embodiment of the invention will be described below with reference to FIGS. 4, 14 and 15.

This embodiment is characterized in the following procedure of processing that is performed by the call processor 41-4 when it has recognized a routing request and the following procedure of processing that is performed by the mobile station 92 as a destination party in liaison with the above processing.

Although this embodiment can similarly be realized on the basis of any of the first to third embodiments, for the sake of simplicity the following description of operation will made in comparison with the first embodiment.

Upon recognition of the routing request that was sent from the home location register 80A and supplied via the communication link 81-4, the call processor 41-4 judges whether termination is possible at the mobile station 92 indicated by the subscriber number ID by recognizing a state or information described below based on the subscriber number ID and the location information included in the routing request (indicated by symbol (5) in FIG. 14).

A state that a certain call occurred in advance at the mobile station 92 indicated by the subscriber number ID and it still continues to exist.

Whether there exists a factor (e.g., a subscriber class or subscriber data) that prevents the mobile station 92 from responding to paging of the local station.

Whether there exists a factor (e.g., congestion or a trouble in the radio base station) that prevents paging of the mobile station 92 in the wireless zone (for simplicity, it is assumed to be the wireless zone 91-3) indicated by the location information.

When the judgment result is true, the call processor 41-4 generates a visit confirming request including the identifier of the call processor 41-4 and the subscriber number ID and sends the generated visit confirming request to the main processor 72 via the communication link 73 (indicated by symbol (A) in FIG. 14; step (A) in FIG. 15).

Upon recognition of the visit confirming request, the main processor 72 generates a visit confirming demand including the subscriber number ID that is included in the visit confirming request (indicated by symbol (B) in FIG. 14). Then, the main processor 72 sends the generated visit confirming demand to all of the call processors 41-1 to 41-N via the communication link 73 (indicated by symbol (C) in FIG. 14).

The call processors 41-1 to 41-N page the mobile station 92 indicated by the subscriber number ID that is included in the visit confirming demand by cooperating with the radio base stations 90-1 to 90-N in parallel via the digital links 71-11 to 71-1n, ..., 71-N1 to 71-Nn, respectively, (indicated by symbol (D) in FIG. 14; step (B) in FIG. 15).

A paging signal that is sent from each of the radio base stations during the course of the paging is a signal that requests the mobile station 92 as a destination party to send back a visit-response without generating ring tones.

When the mobile station 92 visits the wireless zone 91-3, a visit-response that is sent from the mobile station 92 is received by the radio base station 90-3 and transmitted to the call processor 41-3 provided in the submodule 74-3 via one of the digital links 71-31 to 71-3n (indicated by symbol (E) in FIG. 14).

The call processor 41-3 sends the visit-response to the main processor 72 via the communication link 73 (indicated by symbol (F) in FIG. 14). The main processor 72 sends the visit-response to the call processor 41-4 via the communication link 73 (indicated by symbol (G) in FIG. 14; step (C) in FIG. 15).

On the other hand, the call processor 41-4 judges whether it receives a visit-response in a predetermined period starting from the time point when it sent the visit confirming request.

When the call processor 41-4 recognizes that the result of the above judgment is false, the call processor 41-4 suspends the call set-up and the channel control for the call concerned (indicated by symbol (D) in FIG. 15).

When the call processor 41-4 recognizes that the judgment result is true, the call processor 41-4 determines, from among the call processors 41-1 to 41-N, the call processor (hereinafter referred to as "termination processor) 41-3 that is to cooperate with the radio base station 90-3 that forms the wireless zone 91-3 where the mobile station 92 as a destination party of the call concerned visits actually (indicated by symbol (H) in FIG. 14; step (E) in FIG. 15).

Then, the call processor 41-4 assigns unique call identification information TLDN to the termination call concerned, and generates a routing response including, together with the call identification information TLDN and the above-mentioned subscriber number ID and location information, an identifier of the determined termination processor (hereinafter referred to simply as "processor identifier"). Further, the call processor 41-4 sends the generated routing response to the home location register 80A via the switching module 75-4, the digital trunk 77H-4, and the communication link 81-4 (indicated by symbol (b) in FIG. 14; step (b) in FIG. 15).

In other words, the home location register 80A is notified about the termination processor that is to lead call set-up and a channel control for the wireless zone 91-3 where the mobile station 92 indicated by the subscriber number included in the routing request visits only when it has been confirmed that the mobile station 92 can actually respond to paging.

Therefore, the efficiency of processing relating to call processing and a channel control performed by the mobile-service switch office 70A is made higher and the amount of resources to be used for such processing is made smaller than in the first to third embodiments in which the wireless zone 91-3 where the mobile station 92 as a destination party visits and whether the mobile station can respond to paging are not confirmed substantially.

This embodiment is different from the first embodiment in that the call processor 41-4 does not check all or part of the following items:

A load distribution of the call processors 41-1 to 41-N.
Subscriber data of the mobile station 92.
A geographical distribution (zone configuration) of the wireless zones 91-1 to 91-N.

A traffic distribution of the wireless zones 91-1 to 91-N.

Operating statuses of the radio base stations 90-1 to 90-N.

A history of calls that occurred in advance in the mobile station 92.

However, the above items may be checked if a resulting decrease in the efficiency of the above processing is allowable.

An operation of the fifth embodiment of the invention will be described below with reference to FIGS. 4, 14, and 15.

This embodiment is different from the fourth embodiment in the following procedure of processing that is performed by the call processors 41-1 to 41-N in response to a routing request.

When the call processor 41-4 has recognized the routing command that was sent from the home location register 80A and supplied via the communication link 81-4 and has also recognized, in the same manner as in the fourth embodiment, that termination at the mobile station 92 indicated by the subscriber number ID is basically possible (indicated by symbol (5) in FIG. 14), the call processor 41-4 sends a visit confirming request including the subscriber number ID and the identifier of the call processor 41-4 to the main processor 72 via the communication link 73 (indicated by symbol (A) in FIG. 14; step (A) in FIG. 15).

In the same manner as in the fourth embodiment, the visit confirming request is converted into a visit confirming demand by relay processing that is performed by the main processor 72 (indicated by symbol (B) in FIG. 14) and supplied to all of the call processors 41-1 to 41-N via the communication link 73 (indicated by symbol (C) in FIG. 14).

The call processors 41-1 to 41-N page the mobile station 92 indicated by the subscriber number ID that is included in the visit confirming demand by cooperating with the respective radio base stations 90-1 to 90-N (indicated by symbol (D) in FIG. 14; step (B) in FIG. 15).

Further, each of the call processors 41-1 to 41-N judges whether it receives a visit-response in a predetermined period starting from the time point when it started the paging.

When the mobile station 92 visits the wireless zone 91-3, a visit-response sent from the mobile station 92 is transmitted to the call processor 41-3 that is provided in the submodule 74-3 via the radio base station 90-3 and one of the digital links 71-31 to 71-3n.

When the call processor 41-3 receives the visit-response in the above-mentioned period, the call processor 41-3 recognizes that it is a termination processor but does not send the visit-response to the call processor 41-4 as indicated by broken lines in FIGS. 14 and 15 (step (F) in FIG. 15).

Then, the call processor 41-3 assigns unique call identification information TLDN to the termination call concerned, and generates a routing response including the above-mentioned location information together with the call identification information TLDN, an identifier of the termination processor (hereinafter referred to simply as "processor identifier"), and the above-mentioned subscriber number ID. Further, the call processor 41-3 sends the generated routing response to the home location register 80A via the switching module 75-3, the digital trunk 77H-3, and the communication link 81-3 (indicated by symbol (b) in FIG. 14; step (b) in FIG. 15).

That is, a termination processor that is to lead call set-up and a channel control for a wireless zone where the mobile station 92 indicated by a subscriber number included in a routing request actually visits and that has responded to paging sends a routing response directly to the home location register 80A instead of the call processor 41-4 that recognized the routing request.

Therefore, according to this embodiment, call processing and channel control are made simpler, the service quality is made higher, and the cost is made lower than in the fourth embodiment in which such a routing response is sent to the home location register 80A via the call processor 41-4 with relay processing that is performed by the main processor 72.

The above operation of this embodiment has been described in comparison with the fourth embodiment.

However, this embodiment can be realized even in a case where, as in the first to third embodiments, a wireless zone where the mobile station 92 as a destination party visits and a termination processor are not checked substantially, as long as a call processor that has recognized a routing request can request a call processor that performs a channel control and call set-up for a candidate for a wireless zone where the mobile station 92 as a destination party visits, to perform processing of sending a routing response or the former call processor can leave such processing to the latter call processor.

Figure 16:
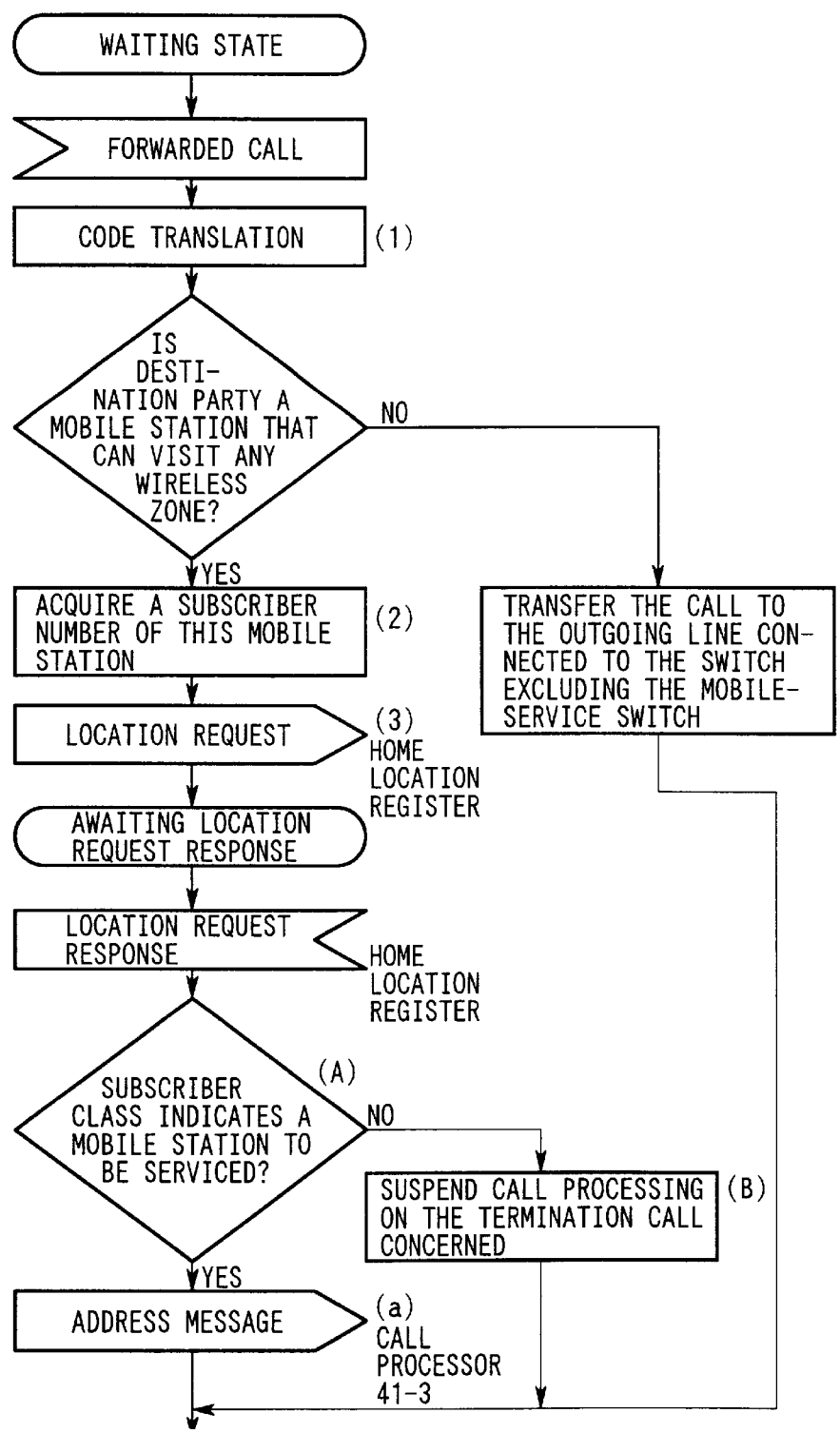
FIG. 16 is an operation flowchart of a gateway switch office according to a sixth embodiment of the invention.

FIG. 16 is an operation flowchart of the gateway switch office according to the six the embodiment of the invention. The steps that are the same as in the first embodiment are given the same reference symbols as in FIG. 6 and will not be described.

An operation of the sixth embodiment will be described with reference to FIGS. 4 and 16.

This embodiment is different from the first embodiment in the following procedure of processing that is performed by the home location register 80A and the gateway switch office 60A.

Upon recognition of the routing response that is supplied from the call processor 41-4 (or the call processor 41-3) via the communication link 81-4 (or 81-3), the home location register 80A generates a location request response including, together with the call identification information TLDN, the subscriber number ID, the location information, and the processor identifier that are included in the routing response, a subscriber class that was registered in advance as corresponding to the subscriber number ID, and sends the generated location request response to the gateway switch office 60A via the communication link 62.

The gateway switch office 60A acquires the subscriber class that is included in the location registration response, and judges whether the subscriber class indicates a mobile station to be provided service under application of the invention (step (A) in FIG. 16).

When the judgment result is false, the gateway switch office 60A suspends the call processing on the termination call concerned according to a predetermined procedure (step (B) in FIG. 16).

Such a call processing procedure is not an important feature of the invention and can be realized by using various known techniques, and hence it will not be described in detail.

On the other hand, if the judgment result is true, the gateway switch office 60A generates an address message including the call identification information TLDN, the subscriber number ID, and the location information that are included in the location request response and sends the generated address message to the mobile-service switch office 70A via an inter-office link corresponding to the processor number that is included in the location request response among the inter-office links 61-1 to 61-N (step (a) in FIG. 16).

That is the destination of an address message is set to a call processor that is to perform call set-up for a wireless zone where the mobile station 92 to be a destination party of a call concerned visits actually or visits at a strong possibility only when the subscriber class of the mobile station 92 is a predetermined subscriber class.

Therefore, according to this embodiment, flexible adaptation to a variety of systems of maintenance, operation, charging, and service is enabled. Further, the efficiency of utilization of resources and the service quality are made higher and the running cost is made lower than in the conventional example.

This embodiment has been described above in comparison with the first embodiment.

However, this embodiment can also be realized on the basis of each of the second to fifth embodiment as long as, as described above, the subscriber class of the mobile station 92 to be a destination party is determined by the home location register 80A and transmitted reliably to the gateway switch office 60A.

In this embodiment, the gateway switch office 60A performs the above-described judgment by paying attention to only the subscriber class of the mobile station 92 to be a destination party.

However, a similar judgment may be made based on, instead of the subscriber class, service order, a traffic distribution, a load distribution of individual sections, and any other attribute as long as it conforms to a desired system of maintenance, operation, charging, and service.

In each of the embodiments, the wireless zones 91-1 to 91-N formed under the mobile-service switch office 70A belong to different location areas and a termination processor or a candidate for a termination processor is selected by a call processor that has recognized a routing request.

However, for example, where all of the wireless zones 91-1 to 91-N belong to the same location area, a termination processor or a candidate for a termination processor may be determined by the gateway switch office 60A.

In the above embodiments, the invention has been applied to a mobile communication system which provides a speech communication service for subscribers.

However, the invention is not limited to such speech communication service, for example, it may be also applied to a communication network where data such as a packet is to be received/transmitted as a speech signal (transmission information).

The invention is not limited to the above embodiments and various modifications may be made without departing from the spirit and scope of the invention. Any improvements may be made in part or all of the components.

What is claimed is:

1. A mobile-service switch comprising:
a plurality of distributed call processing means for performing call processing, as distributed processing according to a load distribution scheme, by associating with a plurality of radio base stations, on a call from an incoming line formed between the plurality of distributed call processing means and a gateway switch office and to be terminated at one of mobile stations that can be located in wireless zones individually formed under the radio base stations;
path forming means for forming a path between said gateway switch office and said plurality of radio base stations based on a procedure of said call processing by said plurality of distributed call processing means, and wherein
in response to an inquiry made by said home location register having location information of said mobile stations as database, made about a mobile station which is to be a destination party of said call, said plurality of distributed call processing means judges whether or not termination at the mobile station is possible, determines one, of said plurality of distributed call processing means, which is to perform call set-up in conformity with channel control over a wireless zone where said mobile station visits, and notifies the determined distributed call processing means and the judgment result to one of said home location register and said gateway switch office.

2. A mobile-service switch according to claim 1, wherein in response to an inquiry from said home location register, said plurality of distributed call processing means pages a mobile station which is to be a destination party of said call, and determines one, of said plurality of distributed call processing means, which has obtained a response to the paging as a distributed call processing means which is to perform a call set-up in conformity with channel control over a wireless zone where said mobile station visits.

3. A mobile-service switch according to claim 1, wherein:
in response to an inquiry from said home location register, said plurality of distributed call processing means pages a mobile station which is to be a destination party of said call; and
one of said plurality of distributed call processing means which independently determines a response to said paging notifies of itself as the determined distributed call processing means to one of said home location register and said gateway switch office.

4. A mobile-service switch according to claim 1, wherein:
an inquiry from said home location register includes an identifier of a wireless zone where a mobile station to be a destination party of said call can be located, among said wireless zones individually formed under said radio base stations; and
said plurality of distributed call processing means judges whether or not termination is possible at said mobile station which is to be destination party of said call, only for said wireless zone indicated by said identifier included in said inquiry.

5. A mobile-service switch according to claim 1, wherein:
an inquiry from said home location register includes an identifier of one of said distributed call processing means which is to perform call processing in conformity with channel control over a wireless zone where a mobile station to be a destination party of said call can be located; and
one of said plurality of distributed call processing means indicated by said identifier included in said inquiry judges whether or not termination is possible at said mobile station which is to be a destination party of said call.

6. A mobile-service switch comprising:
a plurality of distributed call processing means for performing call processing, as distributed processing according to a load distribution scheme, by associating with a plurality of radio base stations, on a call from an incoming line formed between the plurality of distributed call processing means and a gateway switch office and to be terminated at one of mobile stations that can be located in wireless zones individually formed under the radio base stations;
path forming means for forming a path between said gateway switch office and said plurality of radio base stations based on a procedure of said call processing by said plurality of distributed call processing means, and wherein
  in response to an inquiry made by said home location register having location information of said mobile station as database, made about a mobile station which is to be a destination party of said call from, said plurality of distributed call processing means judges whether or not termination at the mobile station is possible and notifies the judgment result to said home location register.

7. A mobile-service switch according to claim 6, wherein:
an inquiry from said home location register includes an identifier of a wireless zone where a mobile station to be a destination party of said call can be located, among said wireless zones individually formed under said radio base stations; and
said plurality of distributed call processing means judges whether or not termination is possible at said mobile station which is to be a destination party of said call, only for said wireless zone indicated by said identifier included in said inquiry.

8. A mobile-service switch according to claim 6, wherein:
an inquiry from said home location register includes an identifier of one of said distributed call processing means which is to perform call processing in conformity with channel control over a wireless zone where a mobile station to be a destination party of said call can be located; and
one of said plurality of distributed call processing means indicated by said identifier included in said inquiry judges whether or not termination is possible at said mobile station which is to be a destination party of said call.

9. A home memory node comprising:
a home memory for storing location information of a wireless zone where a mobile station is actually located, of mobile stations which can be located in a plurality of wireless zones formed under a plurality of mobile-service switch offices; and
controlling means for notifying, when a call to be terminated at one of said mobile stations has occurred, location information of the mobile station and an identifier of the terminated call to one of said plurality of mobile-service switch offices which is to perform call processing in conformity with channel control over a wireless zone indicated by location information stored in said home memory, wherein
  said home memory stores said location information and identifiers of submodules provided in one of said mobile-service switch offices and sharing a load of call processing for one or both of said wireless zones and said mobile stations which can be located in said wireless zones; and
  said controlling means holds location information notified to one of said mobile-service switch offices and notifies, when receiving a response to the location information, of an identifier stored together with the location information in said home memory and the response to said gateway switch office.

10. A home memory node according to claim 9, wherein:
said home memory stores an attribute and location information of said mobile stations; and
said controlling means notifies of an attribute of one of said mobile stations where said termination call has occurred stored in said home memory, together with said response and said identifier to said gateway switch office.

11. A home memory node comprising:
a home memory for storing location information of a wireless zone where a mobile station is actually located, of mobile stations which can be located in a plurality of wireless zones formed under a plurality of mobile-service switch offices; and
controlling means for notifying, when a call to be terminated at one of said mobile stations has occurred, location information of the mobile station and an identifier of the terminated call to one of said plurality of mobile-service switch offices which is to perform call processing in conformity with channel control over a wireless zone indicated by location information stored in said home memory, wherein
  said home memory stores location information and identifiers of submodules provided in one of said mobile-service switch offices and sharing a load of call processing for one or both of said wireless zones and said mobile stations which can be located in said wireless zones; and
  when a call to be terminated at one of said mobile stations has occurred, said controlling means acquires location information and an identifier stored in said home memory, relating to a mobile station where the call has been terminated, and notifies of the location information and the identifier of the termination call to one of said submodules indicated by the identifier.

12. A home memory node comprising:
a home memory for storing location information of a wireless zone where a mobile station is actually located, of mobile stations which can be located in a plurality of wireless zones formed under a plurality of mobile-service switch offices; and
controlling means for notifying, when a call to be terminated at one of said mobile stations has occurred, location information of the mobile station and an identifier of the terminated call to one of said plurality of mobile-service switch offices which is to perform call processing in conformity with channel control over a wireless zone indicated by location information stored in said home memory, wherein
  said home memory stores said location information and identifiers of submodules provided in one of said mobile-service switch offices and sharing a load of call processing for one or both of said wireless zones and said mobile station which can be located in said wireless zones; and
  said controlling means notifies of said location information and an identifier stored in said home memory to one of said mobile-service switch offices, holds the identifier, and notifies, when receiving a response to said location information and the identifier, the held identifier as well as the response to said gateway switch office.

13. A home memory node according to claim 12, wherein:
said home memory stores an attribute and location information of said mobile stations; and
said controlling means notifies of an attribute of one of said mobile stations where said termination call has occurred stored in said home memory, together with said response and said identifier to said gateway switch office.

14. A gateway switch comprising:
call processing means for performing call processing on a call that has occurred on an incoming line and is to be terminated at one of a plurality of mobile stations that can be located in wireless zones individually formed under a plurality of radio base stations and for transferring the call to a mobile-service switch office performing call processing in conformity with channel control over the wireless zones; and path forming means for forming a path between said incoming line and said mobile-service switch office based on a procedure of said call processing performed by said call processing means, and wherein said call processing means requests location information of a wireless zone where one of said mobile stations to be a destination party of said call visits to a home location register, and when receiving a response to the request including an identifier of a submodule which is to share a load of call-processing the call, of said submodules provided in said mobile-service switch offices, said call processing means determines an outgoing line formed between said path forming means and a submodule indicated by the received identifier as an outgoing line for the call.

15. A gateway switch according to claim 14, wherein:

a response to said request for said location information from said home location register includes an attribute of a mobile station which is to be a destination party of said call; and said call processing means judges whether or not said attribute included in said response satisfies a predetermined condition and routes said call only when the judgment result is true.

\* \* \* \* \*